(12) United States Patent
Rosenberg et al.

(10) Patent No.: US 12,424,014 B2
(45) Date of Patent: Sep. 23, 2025

(54) GRAPHICAL DIAGRAM COMPARISON

(71) Applicant: Lucid Software, Inc., South Jordan, UT (US)

(72) Inventors: Cole Rosenberg, South Jordan, UT (US); Zachary Paul Luker, Herriman, UT (US); James A. Hart, Murray, UT (US); Richard John Parker, West Jordan, UT (US)

(73) Assignee: LUCID SOFTWARE INC., South Jordan, UT (US)

( * ) Notice: Subject to any disclaimer, the term of this patent is extended or adjusted under 35 U.S.C. 154(b) by 449 days.

(21) Appl. No.: 17/478,782

(22) Filed: Sep. 17, 2021

(65) Prior Publication Data
US 2023/0086037 A1 Mar. 23, 2023

(51) Int. Cl.
*G06V 30/418* (2022.01)
*G06F 3/0485* (2022.01)
*G06F 16/901* (2019.01)
*G06V 10/75* (2022.01)
*G06V 10/86* (2022.01)

(52) U.S. Cl.
CPC .......... *G06V 30/418* (2022.01); *G06F 3/0485* (2013.01); *G06F 16/9024* (2019.01); *G06V 10/751* (2022.01); *G06V 10/86* (2022.01)

(58) Field of Classification Search
CPC .... G06V 30/418; G06V 10/75; G06V 10/751; G06V 10/86; G06F 3/0485; G06F 16/901; G06F 16/9024
See application file for complete search history.

(56) References Cited

U.S. PATENT DOCUMENTS

| | | | | |
|---|---|---|---|---|
| 6,138,270 A | * | 10/2000 | Hsu | G06F 8/34 717/125 |
| 6,211,879 B1 | * | 4/2001 | Soohoo | G06F 3/0485 715/854 |
| 8,321,197 B2 | * | 11/2012 | Gaudet | G06F 40/274 704/7 |
| 8,497,858 B2 | * | 7/2013 | Jung | H04N 13/261 386/253 |

(Continued)

OTHER PUBLICATIONS

International Search Report and Written Opinion of the International Searching Authority dated Jan. 4, 2023 as received In Application No. PCT/US2022/043252.

*Primary Examiner* — Edward F Urban
*Assistant Examiner* — Benedict E Lee
(74) *Attorney, Agent, or Firm* — Maschoff Brennan

(57) ABSTRACT

In an example, a method to compare graphical diagrams may include comparing a first set of graphical objects of a first graphical diagram to a second set of graphical objects of a second graphical diagram. The method may include, in response to one or more identifying properties of a given graphical object of the first set matching one or more identifying properties of a given graphical object of the second set, declaring the given graphical object of the first set and the given graphical object of the second set a matched pair. The method may include marking each unmatched graphical object a deleted graphical object or an added graphical object. The method may include generating and displaying a comparison graphical diagram that visually identifies differences between the first and second graphical diagrams.

19 Claims, 15 Drawing Sheets

(56) References Cited

U.S. PATENT DOCUMENTS

| | | | |
|---|---|---|---|
| 8,519,979 B1* | 8/2013 | Smith | G06F 3/04883 |
| | | | 700/83 |
| 8,823,711 B2* | 9/2014 | Mital | G06T 11/206 |
| | | | 345/629 |
| 9,183,653 B2* | 11/2015 | Mital | G06T 11/206 |
| 10,466,867 B2* | 11/2019 | Boucher | G06F 3/04847 |
| 2008/0177782 A1* | 7/2008 | Poston | G06F 40/197 |
| | | | 707/999.102 |
| 2009/0051698 A1 | 2/2009 | Boose et al. | |
| 2011/0289084 A1* | 11/2011 | Fisher | G06F 16/41 |
| | | | 707/737 |
| 2012/0304148 A1* | 11/2012 | Braun | G06F 8/71 |
| | | | 717/104 |
| 2014/0358974 A1* | 12/2014 | Romani | G06F 16/901 |
| | | | 707/805 |
| 2015/0287391 A1 | 10/2015 | Padgett | |
| 2018/0060457 A1 | 3/2018 | Homann et al. | |
| 2020/0293171 A1 | 9/2020 | Draper et al. | |
| 2022/0121886 A1* | 4/2022 | Jahjah | G06F 18/24155 |
| 2023/0068544 A1* | 3/2023 | Filipowicz | G06T 11/60 |
| 2023/0076201 A1* | 3/2023 | Bebchuk | H04L 63/0227 |

\* cited by examiner

GRAPHICAL DIAGRAM COMPARISON

FIELD

The embodiments discussed herein are related to graphical diagram comparison.

BACKGROUND

Unless otherwise indicated herein, the materials described herein are not prior art to the claims in the present application and are not admitted to be prior art by inclusion in this section.

Some data, e.g., of networks, organizations, processes, or the like, lends itself to representation in the form of a diagram, such as a network diagram, an organizational chart, or process flow. Such graphical diagrams may be modified over time and it may be desirable to identify changes between different versions of the same graphical diagram, e.g., to see how a network, organization, process, or the like has changed.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to compare graphical diagrams may include comparing a first set of graphical objects of a first graphical diagram to a second set of graphical objects of a second graphical diagram. The method may include, in response to one or more identifying properties of a given graphical object of the first set matching one or more identifying properties of a given graphical object of the second set, declaring the given graphical object of the first set and the given graphical object of the second set a matched pair. The method may include marking each graphical object of the first set that is unmatched to any graphical object in the second set a deleted graphical object. The method may include marking each graphical object of the second set that is unmatched to any graphical object in the first set an added graphical object. The method may include generating and displaying a comparison graphical diagram that visually identifies differences between the first and second graphical diagrams, the differences including at least one of: one or more deleted graphical objects or one or more added graphical objects.

In another example embodiment, a non-transitory computer-readable medium has computer-readable instructions stored thereon that are executable by a processor to perform or control performance of operations. The operations may include comparing a first set of graphical objects of a first graphical diagram to a second set of graphical objects of a second graphical diagram. The operations may include, in response to one or more identifying properties of a given graphical object of the first set matching one or more identifying properties of a given graphical object of the second set, declaring the given graphical object of the first set and the given graphical object of the second set a matched pair. The operations may include marking each graphical object of the first set that is unmatched to any graphical object in the second set a deleted graphical object. The operations may include marking each graphical object of the second set that is unmatched to any graphical object in the first set an added graphical object. The operations may include generating and displaying a comparison graphical diagram that visually identifies differences between the first and second graphical diagrams, the differences including at least one of: one or more deleted graphical objects or one or more added graphical objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Various tools exist to compare and identify differences between different sets of textual data or textual documents, such as MICROSOFT WORD's document compare or track changes tool. However, tools to compare graphical data are more limited. Some graphical comparison tools do a pixel-by-pixel comparison which may require significant processing overhead and may fail to distinguish between edits in the position, size, or other characteristics of otherwise matching graphical objects, added graphical objects, or deleted graphical objects.

Some embodiments herein relate to comparison of graphical diagrams to identify differences therebetween. Such embodiments may compare graphical objects of the first graphical diagram to graphical objects of the second graphical diagram to identify those that match and those that are unmatched. In particular, one or more identifying properties of a given graphical object of the first set may be compared to one or more identifying properties of a given graphical object of the second set and the given graphical objects may be matched, or may be declared a matched pair, if one or more identifying properties of the given graphical objects match or approximately match, within known tolerances.

Differences between the graphical diagrams may be categorized. For example, unmatched graphical objects, or graphical objects that are present in only one or the other of the graphical diagrams, may be categorized as added or deleted, while graphical objects that are part of a matched pair but include one or more differences from one graphical diagram to the other may be categorized as edited. A comparison graphical diagram may be generated and displayed that visually identifies the differences. In some embodiments, the visual identification of differences may differentiate based on the category. For example, added graphical objects may be visually identified using a first color or type of highlighting, deleted graphical objects may be visually identified using a second color or type of highlighting, and edited graphical objects may be visually identified using a third color or type of highlighting. In some embodiments, categories of differences may be turned on or off to allow a user to focus on a subset of all the categories of differences at any given time.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
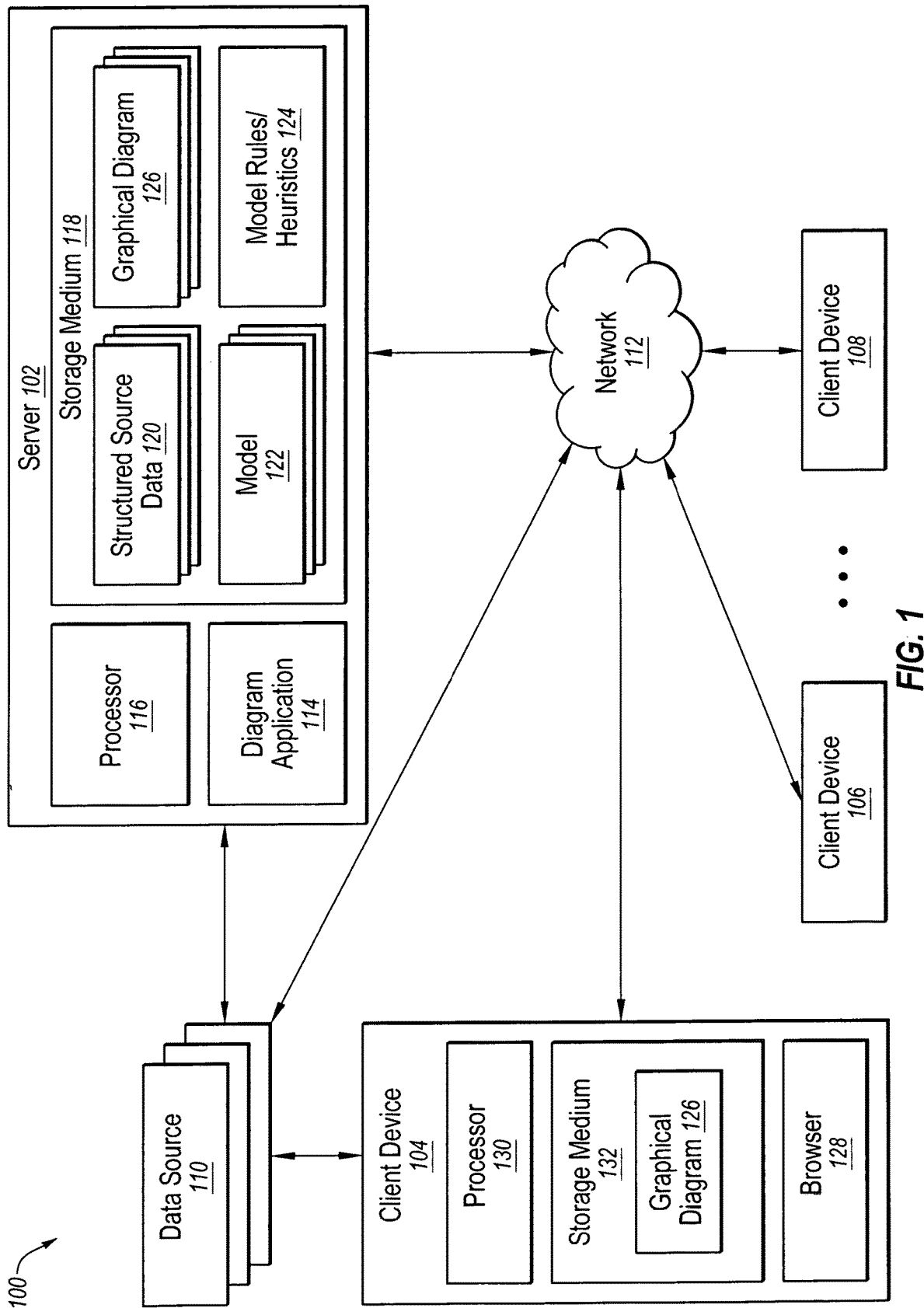
FIG. 1 is a block diagram of an example operating environment that includes a server and one or more client devices.

FIG. 1 is a block diagram of an example operating environment 100 that includes a server 102 and one or more client devices 104, 106, 108, arranged in accordance with at least one embodiment described herein. The server 102 and/or the client devices 104, 106, 108 may be configured to generate and display graphical diagrams or visualizations that include graphical objects and/or to compare graphical diagrams or visualizations. The terms graphical diagram and visualization are used interchangeably herein.

The graphical objects may be based on structured source data or may be unrelated to structured source data. Graphical objects based on structured source data may be referred to as data-backed graphical objects. Graphical objects that are not based on and/or that are unrelated to structured source data may be referred to as simple graphical objects. Simple graphical objects may be stored within a graphical diagram with various graphical attributes, such as shape, size, outline color, fill color, or other graphical attributes. Data-backed graphical objects may be explicitly stored as and/or represented by data collections in structured source data.

Structured source data, when used, may be received from one or more data sources 110. Each of the data sources 110 may include, for example, a cloud infrastructure provider such as AWS, GOOGLE CLOUD, or MICROSOFT AZURE; a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a database schema (e.g., to generate Entity Relationship Diagrams); a service-oriented architecture; physical network discovery tools; custom-built technical systems that can be modeled similar to a network; or other suitable data source and/or data collection. The data in each of the data sources 110 may have a specific format, which may be different and/or the same from one data source 110 to another. Some example data formats include proprietary formats, Structured Query Language (SQL), and JavaScript Object Notation (JSON).

The structured source data may identify two or more nodes, resources, and/or other entities and relationships among them. For instance, the structured source data may identify various network resources such as compute nodes, storage nodes, database nodes, networking nodes (e.g., virtual private clouds (VPCs)), regions, availability zones (AZs), and/or other resources deployed by a customer in AWS as well as relationships among the entities, such as specific ports over which specific nodes can communicate or specific VPCs and/or AZs to which compute nodes belong. As another example, the structured source data may identify databases and tables within databases and/or other entities in a database schema as well as relationships among the entities, such as foreign and/or primary keys. As another example, the structured source data may identify employees, executives, owners and/or other personnel of a company as well as their relationships to each other, such as relative ranks and organization into one or more divisions, departments, or other logical units. Each graphical diagram may graphically represent one or more of the nodes of the structured source data using one or more graphical objects.

The server 102 and/or the client devices 104, 106, 108 may be configured to automatically generate graphical diagrams based on structured source data. The graphical diagrams may be generated based on contract maps. Alternatively or additionally, automatically-generated graphical diagrams or graphical objects therein may be customized by application of conditional formatting. In some embodiments, updates made to the graphical drawings, e.g., to graphical objects within the graphical drawings that represent the nodes, may be propagated back to the structured source data in some circumstances. Alternatively or additionally, the server 102 and/or the client devices 104, 106, 108 may be configured to apply one or more reversible data transforms to the structured source data when generating graphical diagrams. Additional details regarding contract maps, customization of graphical diagrams, conditional formatting, updating structured source data, and reversible data transforms are disclosed in the following U.S. patent documents which are incorporated herein by reference in their entireties: U.S. Pat. Nos. 10,860,602, 10,860,603, U.S. Patent Pub. No. 20200004872 (U.S. application Ser. No. 16/024,551, filed Jun. 29, 2018), and U.S. Patent Pub. No. 20200272608 (U.S. application Ser. No. 16/796,757, filed Feb. 20, 2020).

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and/or the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application (hereinafter application) 114 that allows the client devices 104, 106, 108 to generate and display graphical diagrams. In other embodiments, the application 114 may include a non-web-based application but may generally be described herein as a web-based application for simplicity. Alternatively or additionally, some or all of the functionality described as being performed by the diagram application 114 may be performed locally on the client devices 104, 106, 108, such as by a browser or other application executed by the client devices 104, 106, 108.

The server 102 may additionally include a processor 116 and a storage medium 118. The processor 116 may be of any type such as a central processing unit (CPU), a microprocessor (µP), a microcontroller (µC), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured source data 120, one or more models 122, model rules and/or heuristics 124 ("Model Rules/Heuristics" in FIG. 1), and/or one or more graphical diagram documents 126. Each set of structured source data 120 may be imported from a corresponding one of the data sources 110. The structured source data 120 may be imported over the network 112 or directly from the corresponding data source 110 if a direct connection exists. Each graphical diagram document 126 may include one or more graphical diagrams.

The model rules and/or heuristics 124 include rules and/or heuristics that may be applied to the structured source data 120 to derive information about the nodes and/or their relationships represented in the structured data. The structured source data 120 and/or the information derived by the model rules and/or heuristics 124 may be used by the server 102 to generate the models 122, each model 122 corresponding to a different set of structured source data 120. Some or all of the graphical diagram documents 126 may be generated directly from a corresponding set of the structured source data 120 and/or from a corresponding one of the models 122 derived from the corresponding set of structured source data 120. Graphical diagrams in the graphical diagram documents 126 may be generated based on input received from users at the client devices 104, 106, 108 and may include some or all of the nodes or other entities represented in the corresponding set of structured source data 120 and/or in the corresponding model 122 derived from the corresponding set of structured source data 120. Alternatively or additionally, the graphical diagrams of the graphical diagram documents 126 may include simple graphical objects.

Each of the client devices 104, 106, 108 may execute an application, such as the browser 128, configured to communicate through the network 112 with the server 102. The browser 128 may include an Internet browser or other suitable application for communicating through the network 112 with the server 102. The browser 128 may generate, download and/or interact with structured source data 120 and/or graphical diagram documents 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 116 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram document 126, some of a corresponding set of structured source data 120 or model 122, and/or other content obtained from the server 102 and/or generated locally on the client device 104.

Embodiments described herein are not limited to using a browser to communicate with the server 102 to generate, display, and/or compare graphical diagrams. For example, rather than or in addition to a browser, the client devices 104, 106, 108 may include a native app as are often used on client devices such as mobile devices including smartphones and tablet computers. Accordingly, embodiments described herein generally include generating and displaying graphical diagrams and comparing graphical diagrams using a browser, a native app, or another suitable application on the client devices 104, 106, 108.

FIGS. 2A-2F include graphical representations 200A-200F (collectively "graphical representations 200") of a UI to compare graphical diagrams, arranged in accordance with at least one embodiment described herein. The UI may be provided by the browser 128 and/or the diagram application 114 of FIG. 1. For instance, the browser 128 in cooperation with the diagram application 114 may present the UI to a user through a display of the client device 104. Graphical diagrams generated and displayed in the UI may be saved in graphical diagram documents, such as the graphical diagram documents 126.

In FIGS. 2A-2F, the graphical representations 200 include a graphical drawing canvas 202, a panel 204 to one side of the graphical drawing canvas 202, one or more menus, and/or other UI elements. In other embodiments, the panel 204 may be positioned in some other location relative to the graphical drawing canvas 202 and/or may be expanded into two or more panels. For example, the panel 204 may be positioned on a left side, above, or below the graphical drawing canvas 202 or other location relative to the graphical drawing canvas 202 and/or may be divided into two or more panels positioned in two or more locations relative to the graphical drawing canvas 202.

Figure 2A:
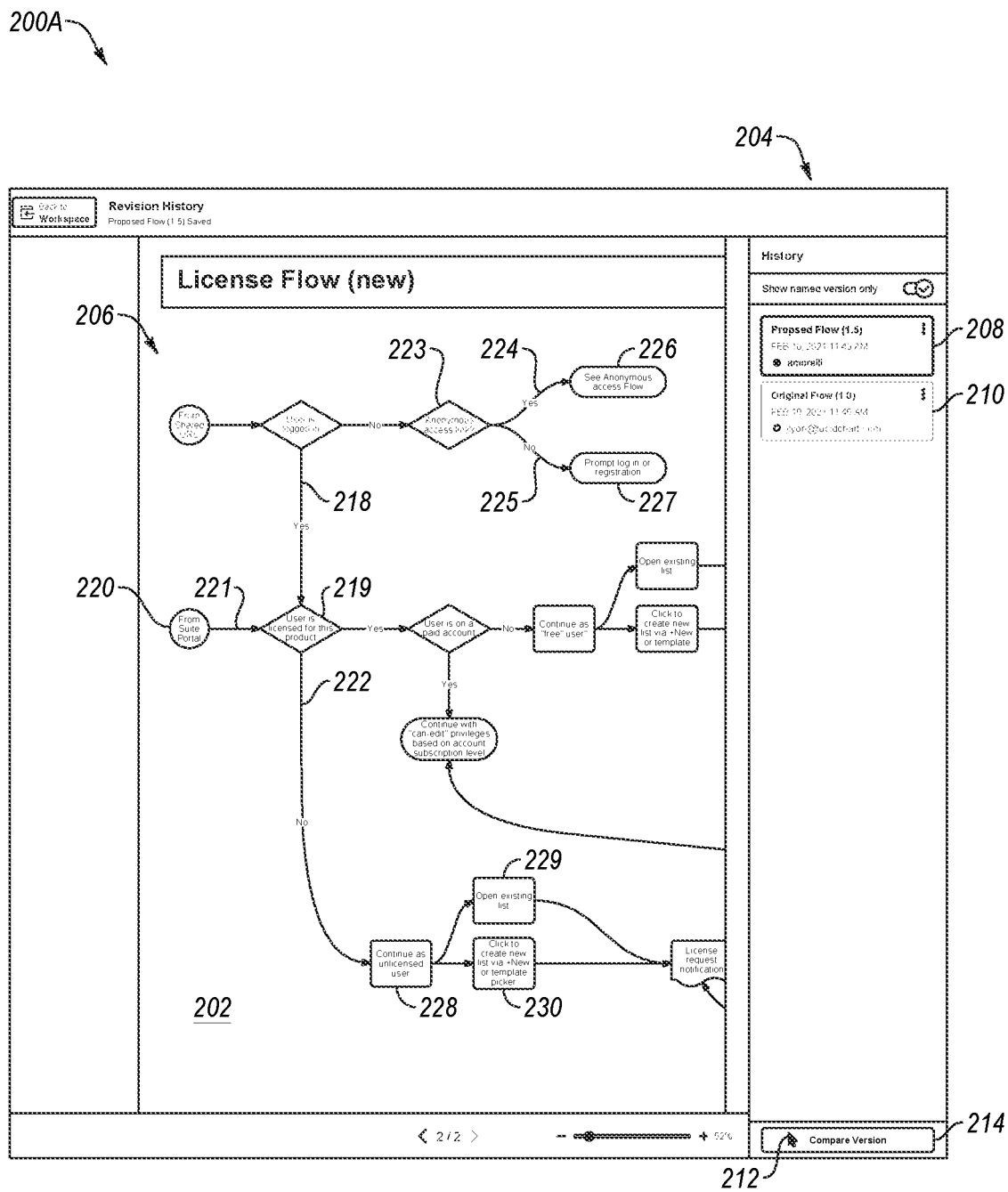
FIGS. 2A-2F include graphical representations of a user interface (UI) to compare graphical diagrams.
Figure 2B:
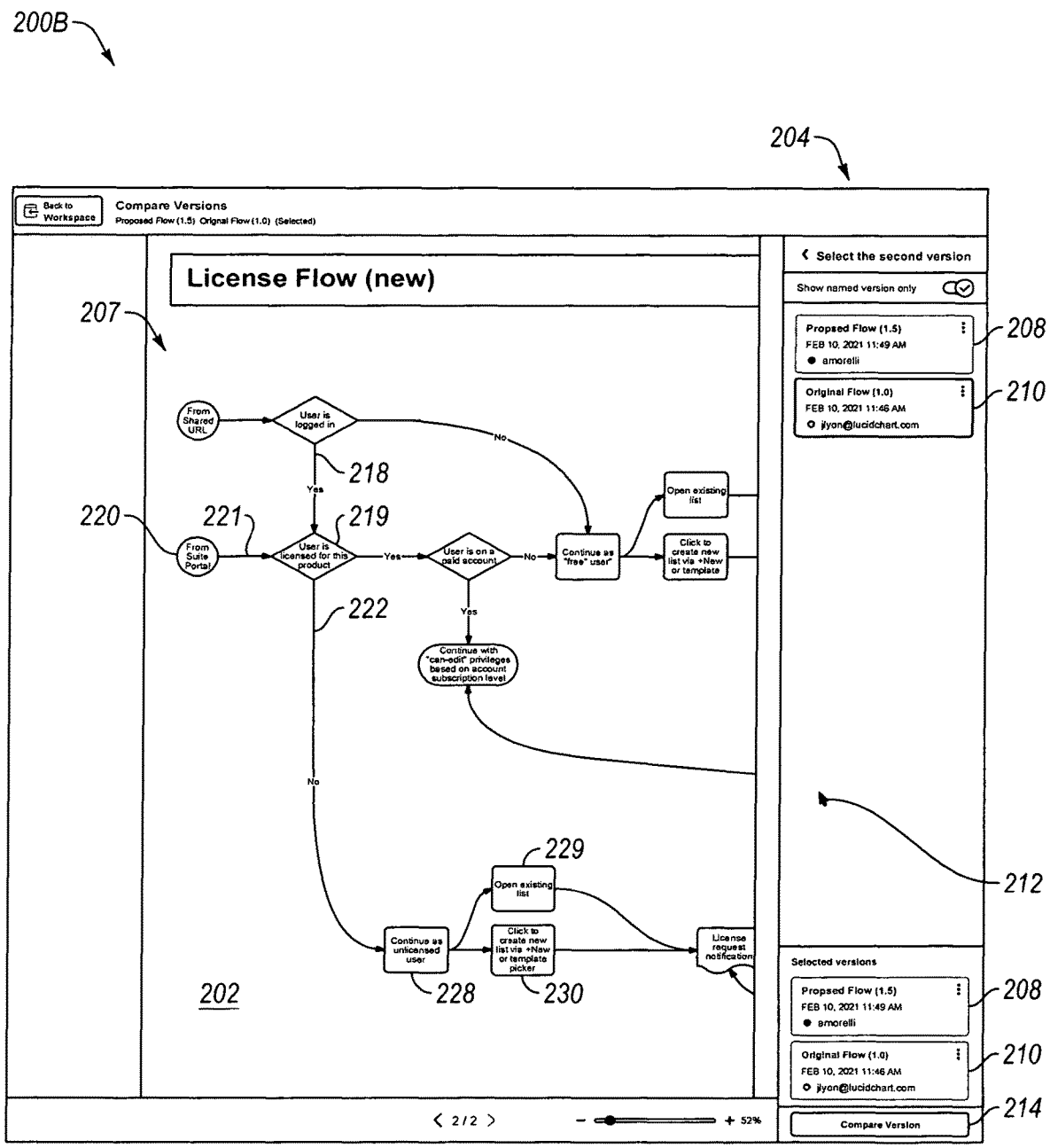

In general, graphical drawings may be displayed in the graphical drawing canvas 202. In FIGS. 2A and 2B, the graphical drawing canvas 202 respectively displays a portion of an example graphical diagram 206, 207 that includes various graphical objects that may be simple graphical objects or data-backed graphical objects that represent resources or nodes in underlying structured source data. The graphical objects in this example include various simple graphical objects, specifically, flowchart graphical objects, including connection blocks, decision blocks, process blocks, terminator blocks, and connectors therebetween. One or both of the graphical diagrams 206, 207 may include additional graphical objects that are not visible in the views of FIGS. 2A and 2B.

The graphical diagrams 206, 207 may be saved in a corresponding graphical diagram document and/or may be saved as different versions of the same graphical diagram document. The panel 204 includes a list of two or more graphical diagram documents or versions 208, 210 from which two may be selected for a comparison to determine and visually identify differences between the two graphical diagram documents or versions, e.g., to a user. More generally, two graphical diagram documents may be selected for comparison that are different versions of the same graphical diagram document, different graphical diagram documents with a common ancestor (e.g., a graphical diagram document template), unrelated graphical diagram documents, or the like. Alternatively or additionally, some graphical diagram documents may include multiple graphical diagrams and a single graphical diagram from each of two of the graphical diagram documents, or a graphical diagram from a graphical diagram document with multiple graphical diagrams and a graphical diagram document with a single graphical diagram, may be selected for comparison.

In the illustrated example, the two graphical diagram documents 208, 210 are respectively named "Proposed Flow (1.5)" and "Original Flow (1.0)" and are different versions of the same document. In FIG. 2A, selection of the graphical diagram document 208, hereinafter the "first graphical diagram document 208", from the panel 204 causes a graphical diagram of the selected document, e.g., the graphical diagram 206, to be displayed in the graphical drawing canvas 202. In FIG. 2B, selection of the graphical diagram document 210, hereinafter the "second graphical diagram document 210", from the panel 204 causes a graphical diagram of the selected document, e.g., the graphical diagram 207, to be displayed in the graphical drawing canvas 202. In these and other embodiments, selections and/or other input may be implemented in any suitable manner and with any suitable devices. For example, FIG. 2A illustrates a mouse cursor 212 that may be moved around the UI by a user operating a corresponding computer mouse (not shown in FIG. 2A); when the mouse cursor 212 is positioned at a desired location, the user may, e.g., select an item over which the mouse cursor 212 is positioned, open a menu, or provide other input by appropriate operation of the computer mouse, e.g., a left-mouse-button click, a right-mouse-button click, or the like.

The panel 204 in FIG. 2A additionally includes a button 214 or other UI element to compare the selected graphical diagram document (the first graphical diagram document 208 in this example) to another graphical diagram document. Selection of the button 214 of FIG. 2A or other suitable input may change the panel 204 as shown in FIG. 2B to allow selection of a second graphical diagram document for the comparison. In the illustrated example of FIG. 2B, the second graphical diagram document 210 is selected for comparison. The panel 204 in FIG. 2B additionally includes a button 216 that may be selected to compare the two graphical diagram documents that are selected for the comparison.

In response to selection of the button 216, graphical objects of the first graphical diagram document 208 may be compared to graphical objects of the second graphical diagram document 210 to identify differences between the graphical diagram documents 208, 210 and/or graphical diagrams 206, 207 of the selected graphical diagram documents 208, 210. Following selection of the button 216 of FIG. 2B, and referring now to FIG. 2C, a comparison graphical diagram 206A and/or 207A may be displayed that visually identifies differences between the first and second graphical diagram documents 208, 210.

The comparison graphical diagram that is displayed to visualize the differences between two graphical diagram documents may include one or both of an altered version of the graphical diagram(s) of the first graphical diagram document or an altered version of the graphical diagram(s) of the second graphical diagram document. In the example illustrated in FIG. 2C, the comparison graphical diagram 206A, 207A specifically includes an altered version of the graphical diagram 206 of the first graphical diagram document 208 and an altered version of the graphical diagram 207 of the second graphical diagram document 210. In these and other embodiments, the comparison graphical diagram 206A, 207A may include the same graphical objects as in the corresponding graphical diagram 206, 207 and may additionally visually identify differences between the graphical diagram 206 and the graphical diagram 207, such as added graphical objects, deleted graphical objects, and/or edited graphical objects. For example, the graphical diagrams 206, 207 and the comparison graphical diagrams 206A, 207A include, among potentially others, graphical objects 218-222 that have been edited in one of the graphical diagrams 206, 207 compared to the other and the graphical diagram 206 and the comparison graphical diagram 206A includes, among potentially others, graphical objects 223-227 that are absent from the graphical diagram 207 and the comparison graphical diagram 207A. Thus, in the comparison graphical diagrams 206A, 207A of FIG. 2C, the graphical objects 218-227 that represent differences between the graphical diagrams 206, 208 may be visually identified, e.g., by highlighting, outlining, addition of an icon, or other suitable manner.

The graphical diagrams 206, 207 additionally include, among potentially others, graphical objects 228-230 that are identical in the graphical diagrams 206, 207. For example, the graphical object 228 is present in both the graphical diagram 206 and the graphical diagram 207 and has not been edited in one of the graphical diagrams 206, 207 compared to the other; as such, the graphical object 228 is identical in the graphical diagrams 206, 207. Graphical objects such as the graphical objects 228-230 that are identical in the graphical diagrams 206, 207 may not be visually identified in the comparison graphical diagram 206A, 206B as differences between the two and/or may be deemphasized in the comparison graphical diagram 206A, 206B. For example, the graphical objects 228-230 are greyed out in the comparison graphical diagrams 206A, 206B to indicate that the graphical objects 228-230 are identical in the graphical diagrams 206, 207 and/or have not changed from one of the graphical diagrams 206, 207 to the other.

Figure 2C:
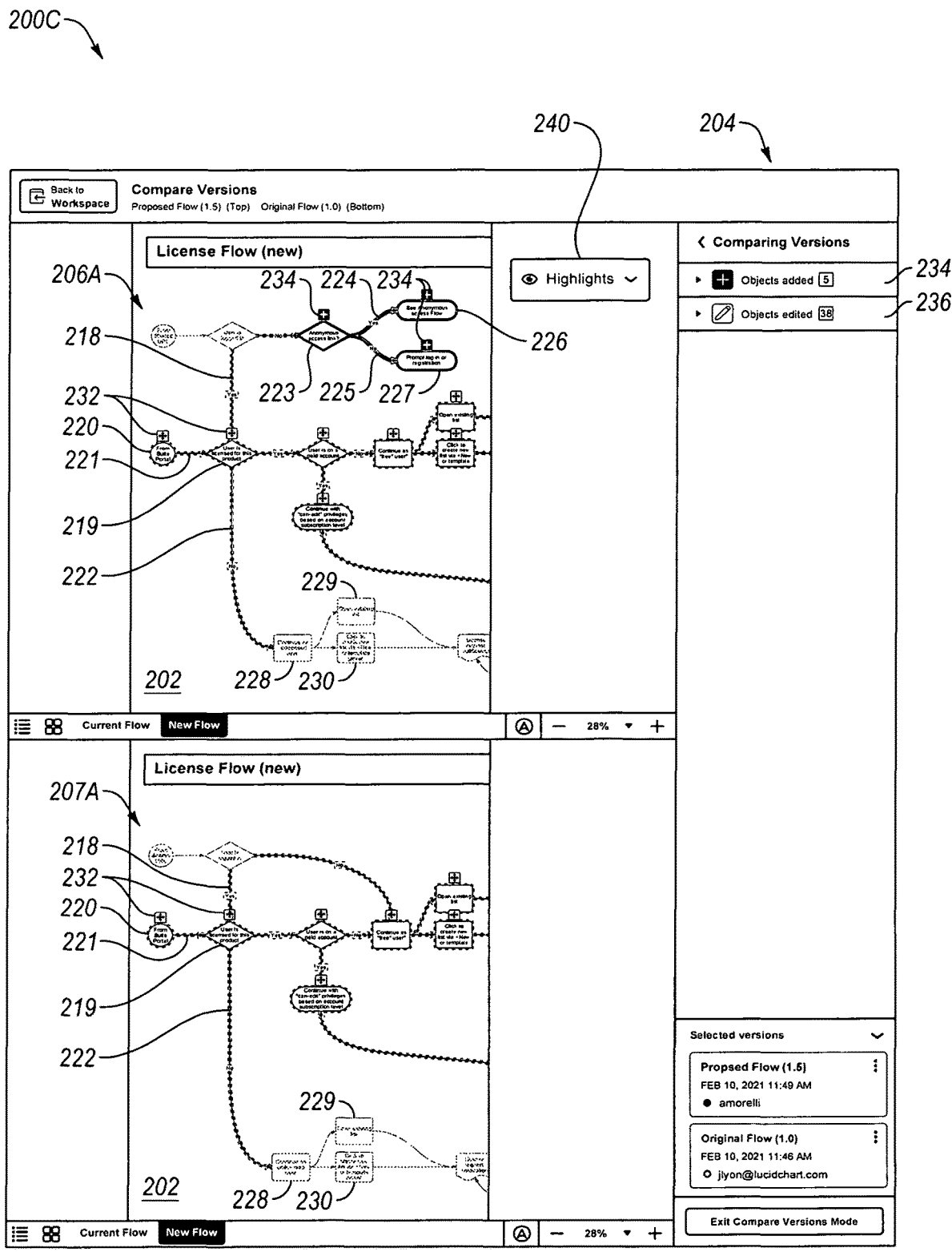

In some embodiments, comparison graphical diagrams generated and displayed as described herein may visually identify one or more of various categories of differences, such as added graphical objects, deleted graphical objects, and/or edited graphical objects. Some or all of the differences may be highlighted in each comparison graphical diagram. Alternatively or additionally, the visual presentation of differences may depend on the difference category of a given difference. For example, added graphical objects may have a first visual presentation, such as addition of an added object icon and/or highlighting or outlining of a first color, line type, or the like, while deleted graphical objects may have a different second visual presentation, such as addition of a deleted object icon and/or highlighting or outlining of a second color, line type, or the like, and so on. In the example of FIG. 2C, the graphical objects 218-222 may be categorized as edited graphical objects while the graphical objects 223-227 may be categorized as added graphical objects. Thus, in the example of the comparison graphical diagram 206A of FIG. 2C, the graphical objects 218-222 are outlined in a first line type (e.g., dashed) and the graphical objects 219, 220 additionally include an edited object icon 232 while the graphical objects 223-227 are outlined in a different second line type (e.g., solid) and graphical objects 223, 226, 227 additionally include an added object icon 234. Similarly, in the example of the comparison graphical diagram 207A of FIG. 2C, the graphical objects 218-222 are outlined in the first line type (e.g., dashed) and the graphical objects 219, 220 additionally include the edited object icon 232. However, the graphical objects 223-227 are not included in the comparison graphical diagram 207A. In this and other embodiments, graphical objects that are present in only one of the graphical diagrams 206, 207, such as the graphical objects 223-227, may be included in only one of the comparison graphical diagrams 206A, 207A. Graphical objects may be determined to be present in only one of two graphical diagram documents (or graphical diagrams) under comparison by matching graphical objects of one of the graphical diagram documents to graphical objects of the other graphical diagram document, as described in greater detail elsewhere herein. Any unmatched graphical objects in either of the two graphical diagram documents is present in only one of the two graphical diagram documents.

In these and other embodiments, the comparison between the two graphical diagram documents may have a direction. The direction of a comparison may refer to which of the two graphical diagram documents is considered as a starting point of the comparison and/or which of the two graphical diagram documents is considered as an ending point of the comparison. In one direction, a graphical object that is present in one graphical diagram document and absent from another graphical diagram document may be considered to be an added graphical object; taken from the other direction, the graphical object may be considered to be a deleted graphical object. In the example of FIG. 2C, the second graphical diagram document 210 and/or the graphical diagram 207 of FIG. 2B is taken as the starting point and the first graphical diagram document 208 and/or the graphical diagram 206 of FIG. 2A is taken as the ending point. As such, the graphical objects 223-227 that are absent from the second graphical diagram document 210 (the starting point in this example) and present in the first graphical diagram document 208 (the ending point in this example) are considered to be added graphical objects. On the other hand, if the comparison direction is reversed such that the first graphical diagram document 208 is considered the starting point and the second graphical diagram document 210 is considered the ending point, the graphical objects 218-222 that are present in the first graphical diagram document 208 and absent from the second graphical diagram document 210 may be considered to be deleted graphical objects. In some embodiments, the panel 204 or elsewhere in the UI of FIGS. 2A-2F may include a button or other UI element that may be selected or otherwise operated to reverse the direction of the comparison, an example of which is described elsewhere herein.

As further illustrated in FIG. 2C, the panel 204 may include one or more drop-down lists 234, 236 of each category of differences. In general, such drop-down lists may include drop-down lists of all changes or differences in a given category and selection of one of the drop-down lists may drop down within the panel 204 a corresponding list of all changes or differences in the given category. In this example, the drop-down list 234 is for added graphical objects and the drop-down list 236 is for edited graphical objects. This example lacks a drop-down list for deleted graphical objects since there are no deleted graphical objects but one may be included when there are deleted graphical objects. FIG. 2F shows an example of the drop-down list 236 in an open or dropped-down state where each of the changes or differences in the category of edited graphical objects is listed. FIG. 2F is also zoomed into a portion of the comparison graphical diagrams 206A, 207A. In some embodiments, selection of one of the listed changes or differences in an open drop-down list of differences may automatically select the corresponding graphical object in the comparison graphical diagram 206A, 207A and/or may automatically navigate a view of the comparison graphical diagram 206A, 207A to show the selected graphical object if it is not already in view. In FIG. 2F, a change or difference 238 to the graphical object 219 has been selected from the drop-down list 236, causing the graphical object 219 to be automatically selected in the comparison graphical diagram 207A, as indicated by the box surrounding the graphical object 219. The graphical object 219 may also be automatically selected in the comparison graphical diagram 206A, although the graphical object 219 is not visible in the view of the comparison graphical diagram 206A in FIG. 2F.

Figure 2D:
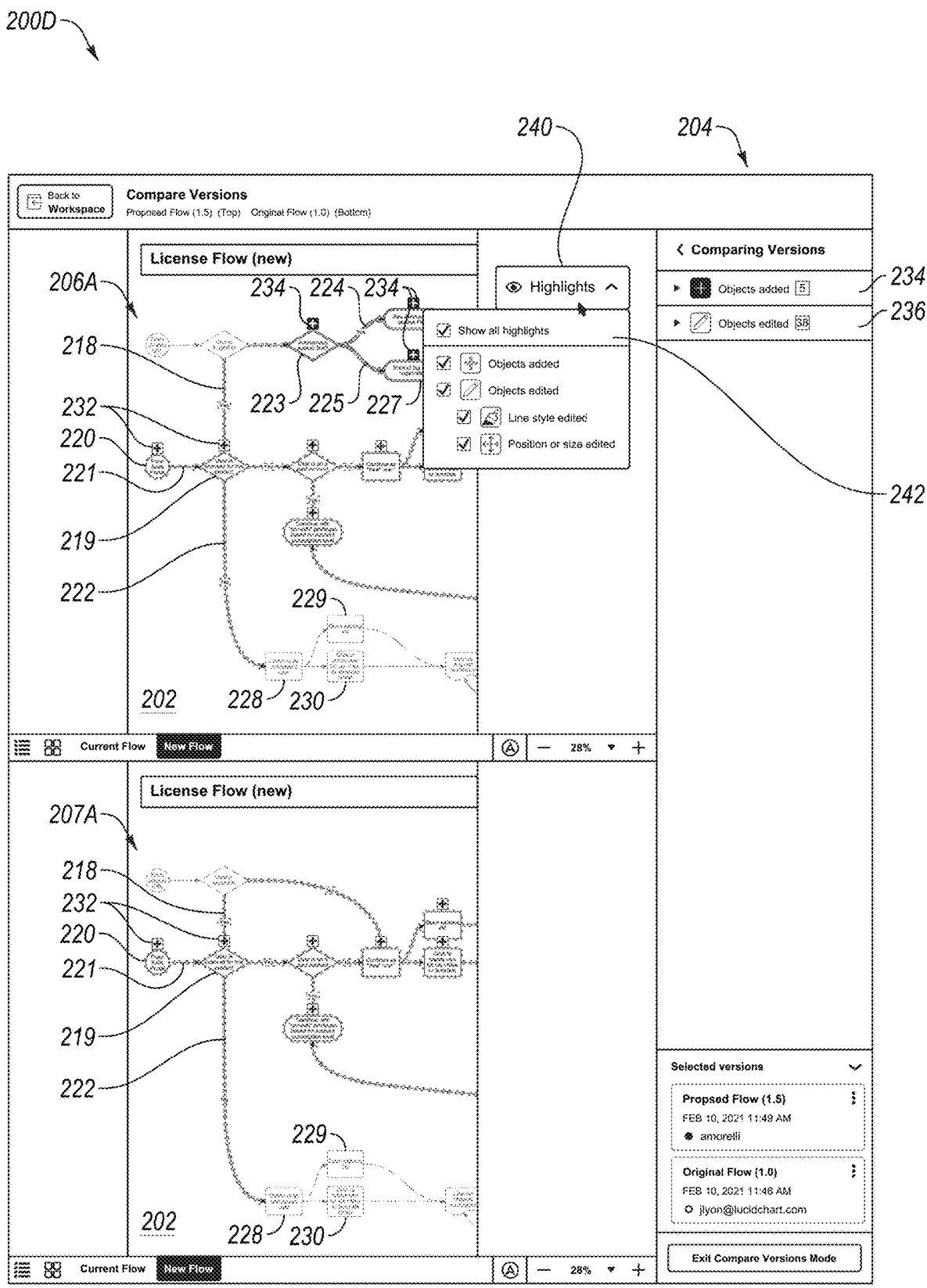
Figure 2E:
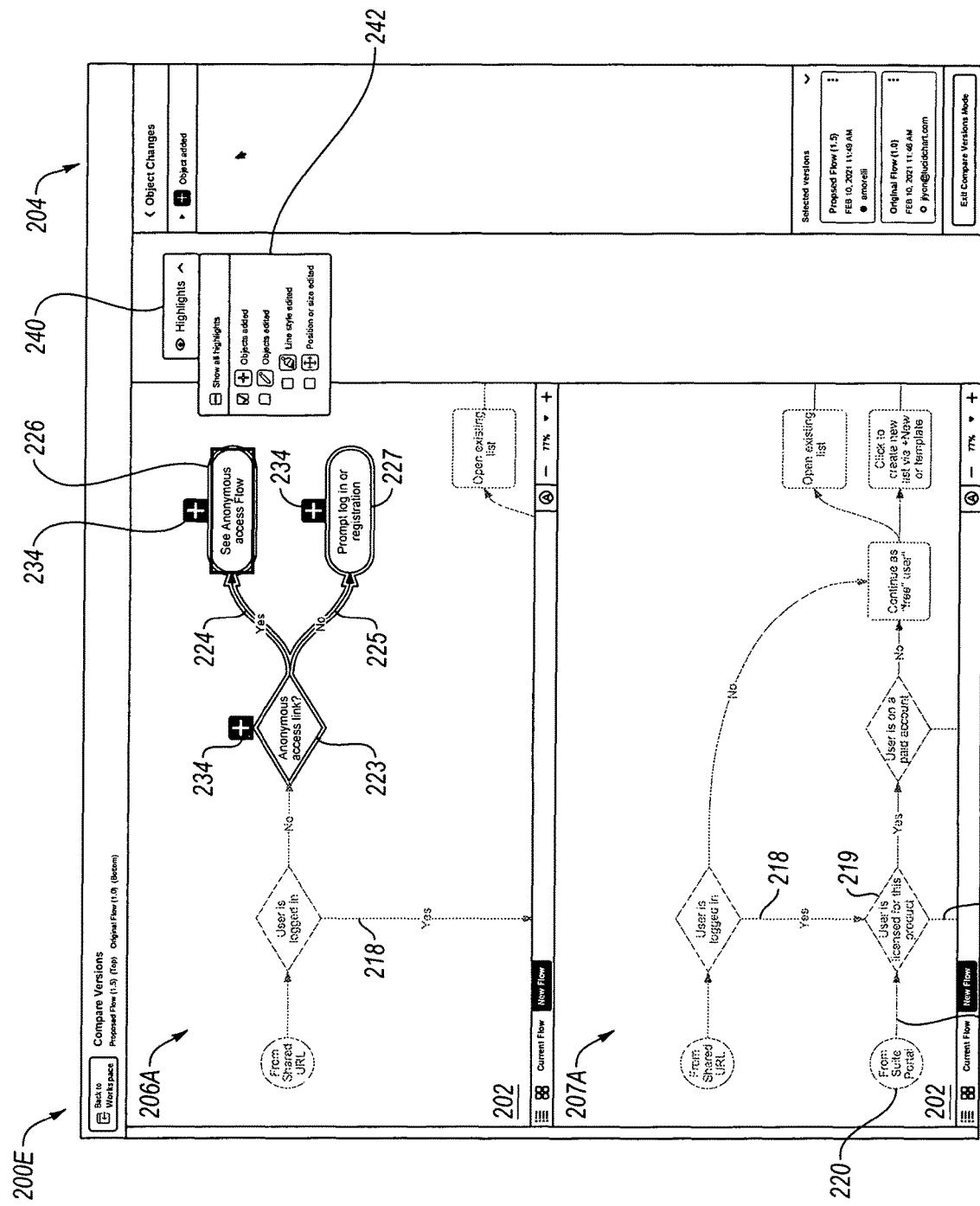
Figure 2F:
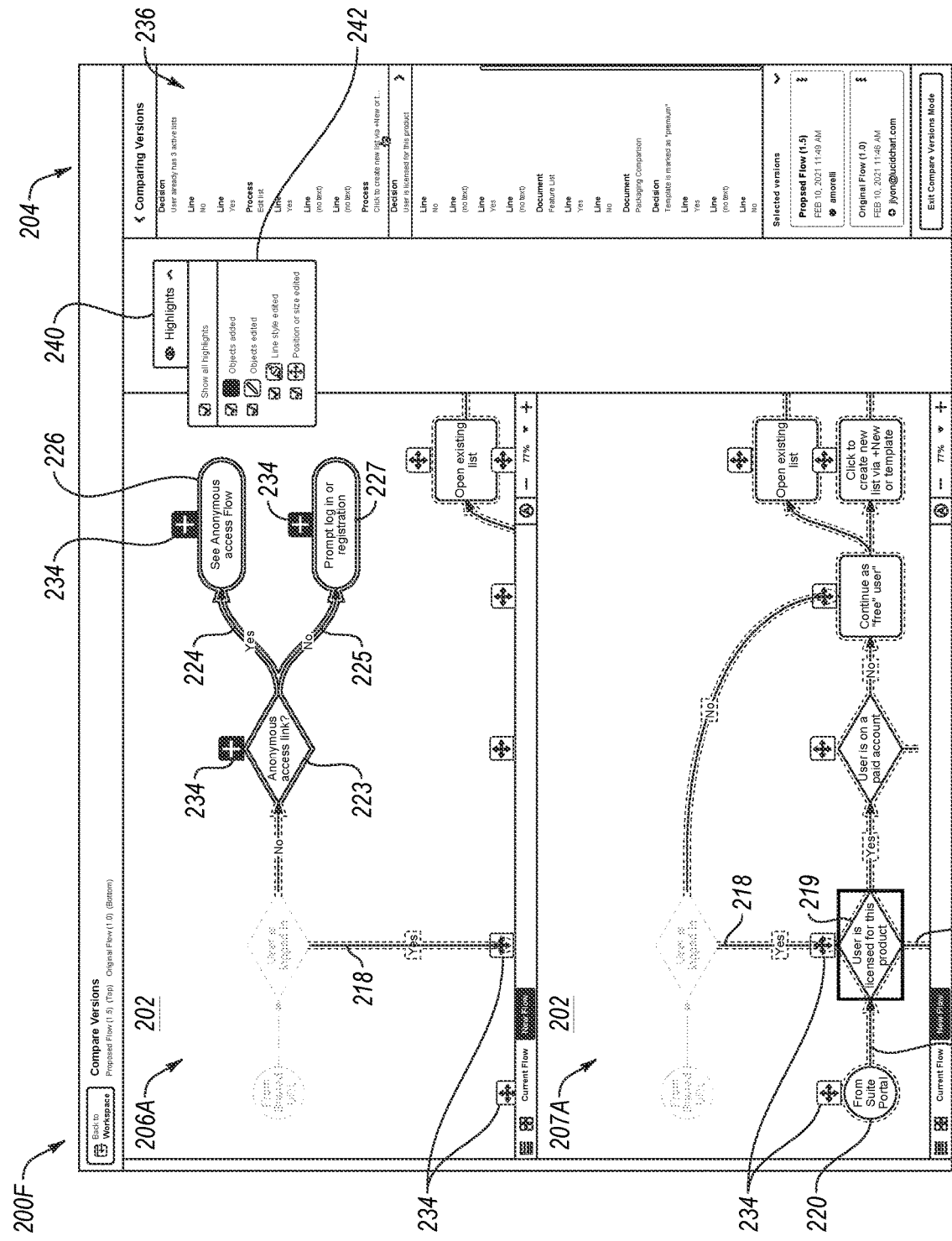

Alternatively or additionally, the UI of FIGS. 2A-2F may include a drop-down menu 240 or other UI element to turn one or more categories of differences on or off in the comparison graphical diagram 206A, 207A. As illustrated in FIG. 2D, selection of the drop-down menu 240 may open an interface 242 in which the user may turn one or more categories of differences on or off. In this particular example, the interface 242 lists each category of differences in the comparison graphical diagram 206A, 207A with a checkbox that can be checked to turn on the category or unchecked to turn off the category. The categories in FIG. 2D include added graphical objects and edited graphical objects. Other embodiments may alternatively or additionally include deleted graphical objects and/or other categories. Some of the categories may be subdivided; in FIG. 2D, the edited graphical objects category is subdivided into different subcategories of edit types, including line style edits and position or size edits. The subdivision of categories into subcategories may allow the user to turn one or more subcategories of differences on or off.

When a category (or subcategory) is turned on, all differences belonging to the turned on category may be highlighted or otherwise visually identified in the comparison graphical diagram 206A, 207A. When a category is turned off, the highlighting or other visual identification of differences belonging to the turned off category in the comparison graphical diagram 206A, 207A may be stopped or terminated. FIG. 2E shows the comparison graphical diagram 206A, 207A with the category of edited graphical objects turned off in the interface 242 (and zoomed in to a smaller portion of the comparison graphical diagram 206A, 207A than in FIGS. 2C and 2D). Because the category of edited graphical objects is turned off in FIG. 2E, the highlighting and/or other visual identification of the graphical objects 218-222 (only some of which are visible in the comparison graphical diagram 206A of FIG. 2E) and other graphical objects that represent differences in the edited graphical objects category is stopped or terminated. In some embodiments, not only is the highlighting or other visual identification stopped or terminated for graphical objects belonging to a category of differences that has been turned off, but the graphical objects belonging to the category of differences that has been turned off may also be greyed out, as illustrated in FIG. 2E. The ability to turn categories of differences on or off may permit a user to focus on one or more, but not all, of the categories of differences at a time. For example, the user may be interested in viewing only those graphical objects that were edited, only those graphical objects that were added, or only those graphical objects that were deleted. In some embodiments, the interface 242 may include an option to turn on or off all categories of differences, such as an option to "Show all highlights", that may be checked or otherwise operated to turn on highlighting or other visual identification of differences belonging to all categories or unchecked or otherwise operated to turn off all highlighting or other visual identification of differences of all categories in the comparison graphical diagram 206A, 207A.

Figure 3A:
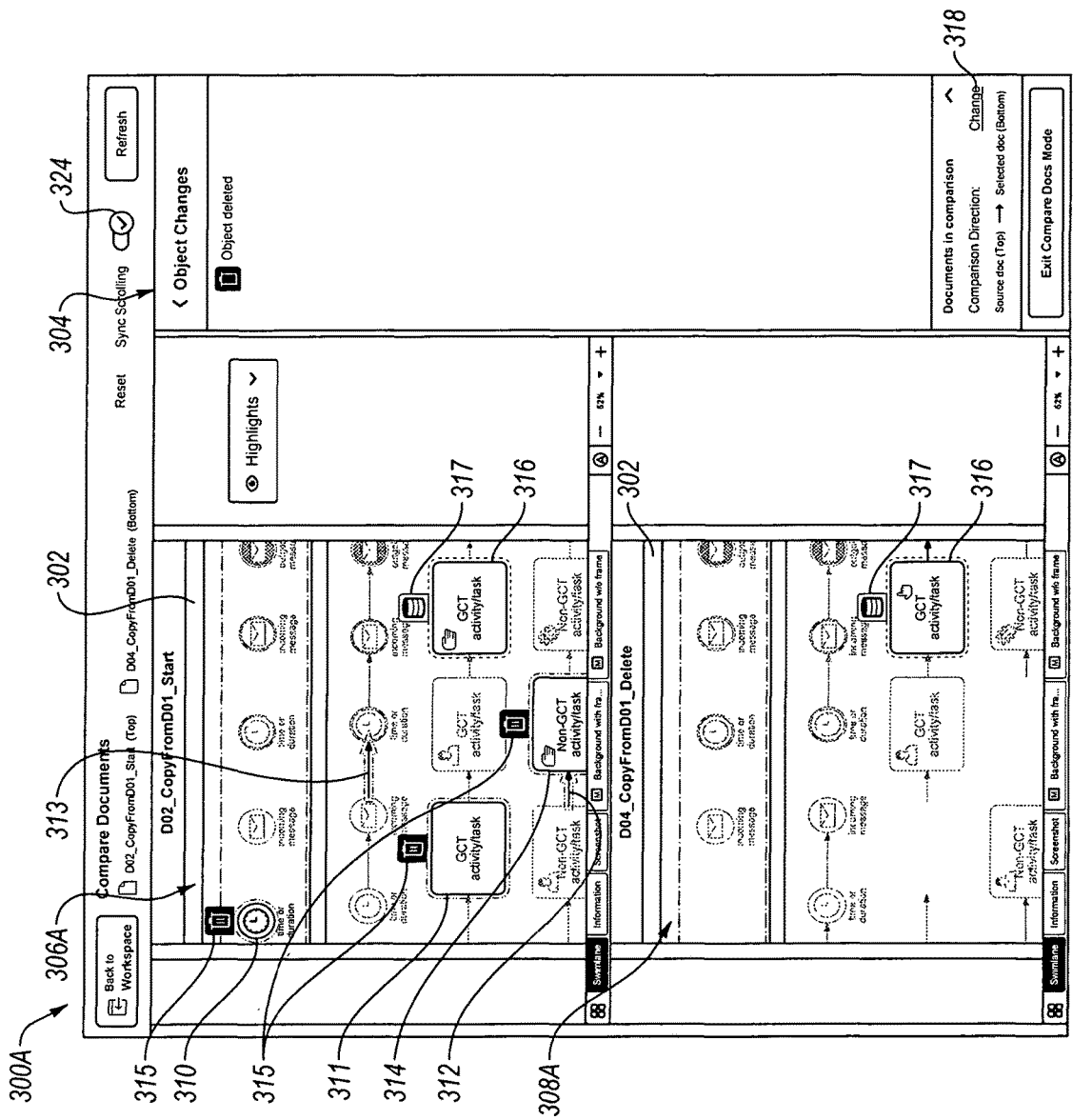
FIGS. 3A-3C include graphical representations of another UI to compare graphical diagrams.
Figure 3B:
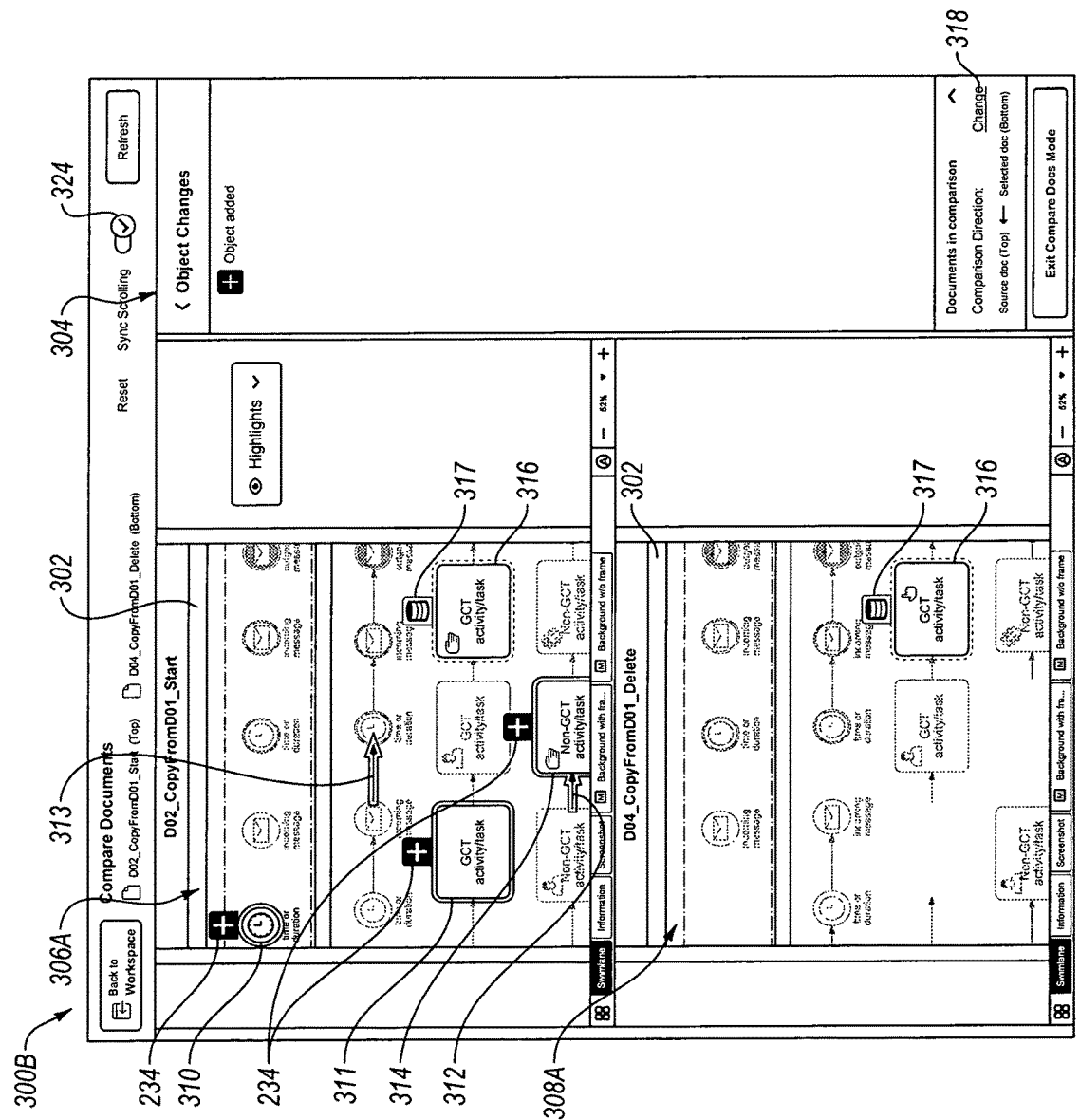
Figure 3C:
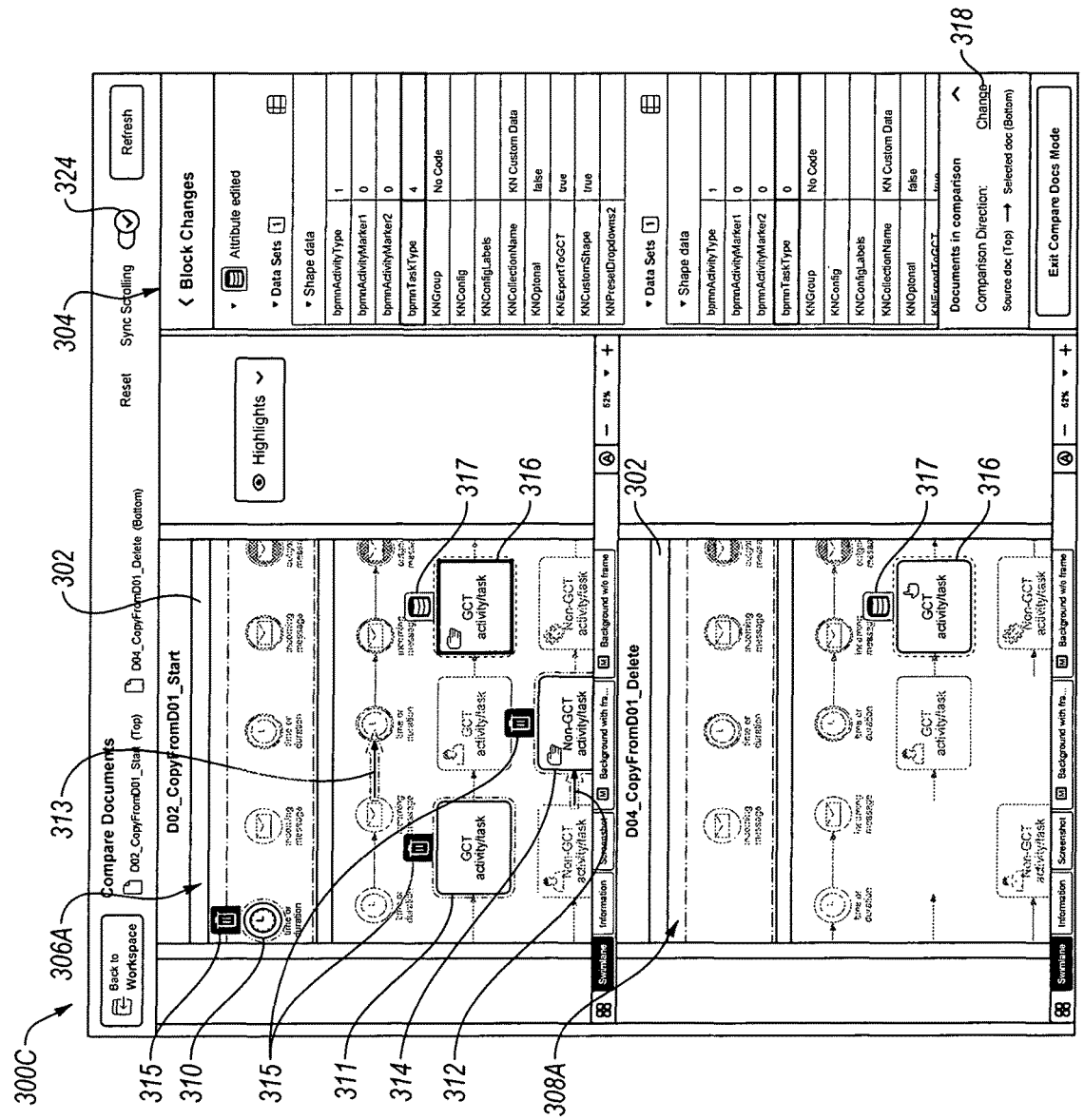

FIGS. 3A-3C include graphical representations 300A-300C (collectively "graphical representations 300") of another UI to compare graphical diagrams, arranged in accordance with at least one embodiment described herein. The UI may be provided by the browser 128 and/or the diagram application 114 of FIG. 1. For instance, the browser 128 in cooperation with the diagram application 114 may present the UI to a user through a display of the client device 104. Graphical diagrams generated and displayed in the UI may be saved in graphical diagram documents, such as the graphical diagram documents 126. The UI of FIGS. 3A-3C may include one or more of the same or similar elements as the UI of FIGS. 2A-2F.

In FIGS. 3A-3C, the graphical representations 300 include a graphical drawing canvas 302, a panel 304 to one side of the graphical drawing canvas 302, one or more menus, and/or other UI elements. In other embodiments, the panel 304 may be positioned in some other location relative to the graphical drawing canvas 302 and/or may be expanded into two or more panels. For example, the panel 304 may be positioned on a left side, above, or below the graphical drawing canvas 302 or other location relative to the graphical drawing canvas 302 and/or may be divided into two or more panels positioned in two or more locations relative to the graphical drawing canvas 302. One or both of the graphical drawing canvas 302 or the panel 304 may be the same as or similar to the graphical drawing canvas 202 or the panel 204 of FIGS. 2A-2F.

FIG. 3A further illustrates a comparison graphical diagram 306A, 308A that may be generated and displayed as described herein by comparing corresponding graphical diagrams or graphical diagram documents. In the example of FIG. 3A, the graphical diagram represented by the comparison graphical diagram 306A is the starting point of the comparison while the graphical diagram represented by the comparison graphical diagram 308A is the ending point of the comparison. Thus, graphical objects 310-314 that are present only in the graphical diagram represented by the comparison graphical diagram 306A are illustrated in the comparison graphical diagram 306A as deleted graphical objects that have a different highlighting, outline, or other visual identification, such as a deleted object icon 315, than added graphical objects or edited graphical objects (see, e.g., FIG. 2C). As further illustrated in FIG. 3A, a graphical object 317 that has had associated metadata edited is illustrated in the comparison graphical diagram 306A, 308A as a metadata edited graphical object that has a different highlighting, outline, or other visual identification, such as a metadata edited object icon 317, than added graphical objects or edited graphical objects.

In some embodiments, the panel 304 or elsewhere in the UI of FIGS. 3A-3C includes a button 318 or other UI element that may be selected or otherwise operated to reverse the direction of the comparison. Insofar as FIG. 3A involves the graphical diagram represented by the comparison graphical diagram 306A as the starting point of the comparison with the graphical diagram represented by the comparison graphical diagram 308A as the ending point of the comparison. Selection of the button 318 may reverse the direction of the comparison relative to FIG. 3A such that the graphical diagram represented by the comparison graphical diagram 308A is the starting point of the comparison while the graphical diagram represented by the comparison graphical diagram 306A is the ending point of the comparison.

FIG. 3B illustrates reversed comparison graphical diagrams 306B, 308B that may be displayed in response to selection of the button 318 in FIG. 3A. With the graphical diagram represented by the comparison graphical diagram 308A (or the reversed comparison graphical diagram 308B) as the starting point of the comparison and the graphical diagram represented by the comparison graphical diagram 306A (or the reversed comparison graphical diagram 306B) as the ending point of the comparison, the graphical objects 310-314 that are present only in the graphical diagram represented by the comparison graphical diagram 306A are illustrated in FIG. 3B as added graphical objects with corresponding highlighting, outline, or other visual identification, such as the added object icon 234, to indicate that the graphical objects 310-314 represent changes in the category of added graphical objects. If the button 318 shown in FIG. 3B is selected while the reversed comparison graphical diagrams 306B, 308B are displayed, the reversed comparison graphical diagrams 306B, 308B may revert to the comparison graphical diagrams 306A, 308A of FIG. 3A.

In some embodiments, when metadata or other identifying property of a graphical object that is not visible on the graphical object itself is edited, the edit that is made may be described or shown elsewhere, such as in the panel 304. For example, and referring to FIG. 3C, metadata of the graphical object 316 is included in the panel 304 for both the graphical diagram represented by the comparison graphical diagram 306A and the graphical diagram represented by the comparison graphical diagram 306B, respectively denoted in FIG. 3C as metadata 320 and metadata 322. Within each of the metadata 320, 322, one or more attributes that have been edited from one to the other may be highlighted, such as a bpmnTaskType attribute in this example. In particular, as illustrated, the bpmnTaskType attribute of the graphical object 316 has a value of 4 in the metadata 320 and a value of 0 in the metadata 322.

In some embodiments, scrolling within either of the comparison graphical diagrams 306A, 308A or the reverse comparison graphical diagrams 306B, 308B may be synchronized. For example, if a user scrolls or otherwise navigates within the comparison graphical diagram 306A to a particular graphical object, the comparison graphical diagram 308A may automatically scroll or otherwise navigate automatically to the same graphical object (if the particular graphical object is part of a matched pair) and/or to a same or approximately same location (if the particular graphical object is not part of a matched pair). In these and other embodiments, the UI of FIGS. 3A-3C may include a button 324 or other UI element to turn synchronized scrolling on or off. The button 324 may be implemented as a toggleable button or other UI element. In FIGS. 3A-3C, the button 324 is depicted toggled to an on position such that synchronized scrolling is turned on. Selecting the button 324 when it is toggled to on, e.g., via left-mouse-button click or other suitable input, may toggle the button 324 to off.

Figure 4:
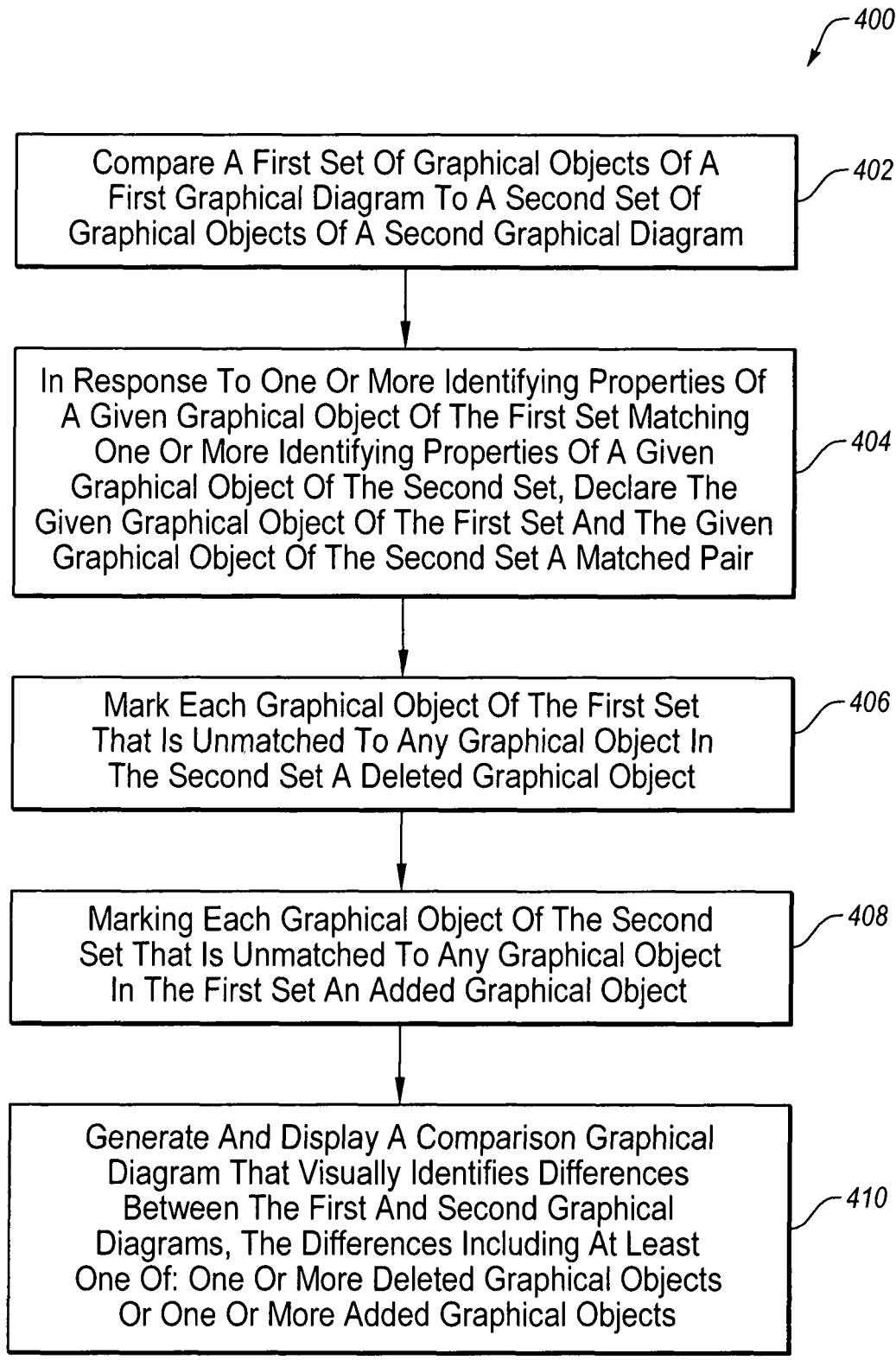
FIG. 4 illustrates a flowchart of an example method to compare graphical diagrams.

FIG. 4 illustrates a flowchart of an example method 400 to compare graphical diagrams, arranged in accordance with at least one embodiment described herein. The method 400 may be directly performed on two graphical diagrams, on two graphical diagram documents that each include one or more graphical diagrams, on a graphical diagram and a graphical diagram document that includes at least one graphical diagram, or on two versions of the same graphical diagram or graphical diagram document. Each of the foregoing use cases involves the comparison of two graphical diagrams (e.g., two versions of the same graphical diagram document, a graphical diagram and a graphical diagram document that includes a graphical diagram, etc.) and the discussion that follows accordingly describes the comparison of graphical diagrams. The method 400 may be performed by any suitable system, apparatus, or device. For example, any one or more of the client devices 104, 106, 108, the diagram application 114, and/or the server 102 of FIG. 1 may perform or direct performance of one or more of the operations associated with the method 400. In these and other embodiments, the method 400 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 400 or one or more operations thereof. The method 400 may include one or more of blocks 402, 404, 406, 408, and/or 410.

At block 402, the method 400 may include comparing a first set of graphical objects of a first graphical diagram to a second set of graphical objects of a second graphical diagram. For example, block 402 may include comparing the graphical objects of the graphical diagram 207 of FIG. 2B ("a first set of graphical objects of a first graphical diagram") to the graphical objects of the graphical diagram 206 of FIG. 2A ("a second set of graphical objects of a second graphical diagram").

In some embodiments, comparing the first set to the second set at block 402 may include comparing the first set to the second set in multiple sequential comparing stages. At each comparing stage, each graphical object of the first and second sets that has been declared as part of a matched pair may be removed from a group of unmatched graphical objects and unmatched graphical objects of the first set in the group may be compared to unmatched graphical objects of the second set in the group. Comparing the first set to the second set in multiple sequential comparing stages may include at least one of: comparing unique IDs of the unmatched graphical objects of the first set to unique IDs of the unmatched graphical objects of the second set; case sensitive comparing of text of the unmatched graphical objects of the first set to text of the unmatched graphical objects of the second set; case insensitive comparing of text of the unmatched graphical objects of the first set to text of the unmatched graphical objects of the second set; endpoint comparing of unmatched connector graphical objects of the first set to unmatched connector graphical objects of the second set; comparing of metadata of the unmatched graphical objects of the first set to metadata of the unmatched graphical objects of the second set; comparing of data attached to the unmatched graphical objects of the first set to data attached to the unmatched graphical objects of the second set; comparing shapes of the unmatched graphical objects of the first set to shapes of the unmatched graphical objects of the second set; comparing sizes of the unmatched graphical objects of the first set to sizes of the unmatched graphical objects of the second set; or comparing of text of the unmatched graphical objects of the first set to text of the unmatched graphical objects of the second set. More generally, each stage of the comparing may involve comparing an identifying property of a given graphical object of the first set to the same identifying property of a given graphical object of the second set. Block 402 may be followed by block 404.

At block 404, the method 400 may include, in response to one or more identifying properties of a given graphical object of the first set matching one or more identifying properties of a given graphical object of the second set, declaring the given graphical object of the first set and the given graphical object of the second set a matched pair. For example, in response to a unique identifier (ID) or other identifying property of each of the graphical objects 218-222 and 228-230 of the graphical diagram 206 of FIG. 2A matching a unique ID or other identifying property of each of the graphical objects 218-222 and 228-230 of the graphical diagram 207 of FIG. 2B, the graphical object 218 of the graphical diagram 206 and the graphical object 218 of the graphical diagram 207 may be declared a matched pair, the graphical object 219 of the graphical diagram 206 and the graphical object 219 of the graphical diagram 207 may be declared a matched pair, and so on. Block 404 may be followed by block 406.

At block 406, the method 400 may include marking each graphical object of the first set that is unmatched to any graphical object in the second set a deleted graphical object.

For example, if the graphical diagram 206 of FIG. 2A is the starting point and the graphical diagram 207 of FIG. 2B is the ending point of the comparison at block 402, the graphical objects 223-227 may be marked as deleted graphical objects since they are present only in the graphical diagram 206 such that the graphical objects 223-227 may be unmatched after the comparison at block 402. As another example, if the graphical diagram represented by the comparison graphical diagram 306A of FIG. 3A is the starting point and the graphical diagram represented by the comparison graphical diagram 308A of FIG. 3A is the ending point of the comparison at block 402, the graphical objects 310-314 may be marked as deleted graphical objects since they are present only in the graphical diagram represented by the comparison graphical diagram 306A such that the graphical objects 310-314 may be unmatched after the comparison at block 402. Block 406 may be followed by block 408.

At block 406, the method 400 may include marking each graphical object of the second set that is unmatched to any graphical object in the first set an added graphical object. For example, if the graphical diagram 206 of FIG. 2A is the ending point and the graphical diagram 207 of FIG. 2B is the starting point of the comparison at block 402, the graphical objects 223-227 may be marked as added graphical objects since they are present only in the graphical diagram 206 such that the graphical objects 223-227 may be unmatched after the comparison at block 402. As another example, if the graphical diagram represented by the comparison graphical diagram 306A of FIG. 3A is the ending point and the graphical diagram represented by the comparison graphical diagram 308A of FIG. 3A is the starting point of the comparison at block 402, the graphical objects 310-314 may be marked as added graphical objects since they are present only in the graphical diagram represented by the comparison graphical diagram 306A such that the graphical objects 310-314 may be unmatched after the comparison at block 402. Block 408 may be followed by block 410.

At block 410, the method 400 may include generating and displaying a comparison graphical diagram that visually identifies differences between the first and second graphical diagrams, the differences including at least one of: one or more deleted graphical objects or one or more added graphical objects. For example, block 410 may include generating and displaying the comparison graphical diagram 206A, 207A of FIG. 2C or the comparison graphical diagram 306A, 308A of FIG. 3A in which added graphical objects and/or deleted graphical objects are visually identified.

In some embodiments, displaying the comparison graphical diagram at block 410 may include: displaying an altered version of the first graphical diagram in which differences between the first graphical diagram and the second graphical diagram are visually identified; and simultaneously displaying an altered version of the second graphical diagram in which differences between the first graphical diagram and the second graphical diagram are visually identified. For example, FIGS. 2C and 3A both illustrate examples in which the comparison graphical diagram 206A, 207A, 306A, 308A includes the comparison graphical diagram 207A, 306A ("an altered version of the first graphical diagram") in which differences between the graphical diagram 207 or the graphical diagram represented by the comparison graphical diagram 306A and the graphical diagram 206 or the graphical diagram represented by the comparison graphical diagram 308A are visually identified. FIGS. 2C and 3A further include as part of the comparison graphical diagram 206A, 207A, 306A, 308 the simultaneously displayed comparison graphical diagram 206A, 308A ("an altered version of the second graphical diagram") in which differences between the graphical diagram 207 or the graphical diagram represented by the comparison graphical diagram 306A and the graphical diagram 206 or the graphical diagram represented by the comparison graphical diagram 308A are visually identified.

In some embodiments, the method 400 may further include, for each matched pair, determining whether the given graphical object of the first set is identical to the given graphical object of the second set. For example, for each of the matched pairs declared for the graphical objects 218-222 and 228-230 of the graphical diagram 206 of FIG. 2A and of the graphical diagram 207 of FIG. 2B, it may be determined whether the graphical object 218-222, 228-230 of the graphical diagram 206 of FIG. 2A is identical to the graphical object 218-222, 228-230 of the graphical diagram 207 of FIG. 2B. In this example, it may be determined that the graphical objects 228-230 of the graphical diagram 206 and the graphical objects 228-230 of the graphical diagram 207 are identical while the graphical objects 218-222 of the graphical diagram 206 and the graphical objects 218-222 of the graphical diagram 207 are not identical. In some embodiments, the differences between graphical objects of a matched pair that are not identical may be determined. For example, it may be determined in this example that the position, size, or location of the graphical object 218 within one of the graphical diagrams 206, 207 has been changed relative to within the other of the graphical diagrams 206, 207. In this and other embodiments, the differences between the first and second graphical diagrams visually identified in the comparison graphical diagram may further include an edit for each matched pair in which the given graphical object of the first set is not identical to the given graphical object of the second set. For example, FIGS. 2C and 3A illustrate embodiments in which edited graphical objects are visually identified in the comparison graphical diagram 206A, 207A, 306A, 308A.

Alternatively or additionally, the method 400 may further include receiving input effective to reverse a comparison direction between the first and second graphical diagrams and altering the comparison graphical diagram to display the comparison graphical diagram with the reversed comparison direction. For example, receiving the input effective to reverse the comparison direction may include receiving a selection (e.g., via left-mouse-button click or other suitable input) of the 318 of FIG. 3A. Altering the comparison graphical diagram to display the comparison graphical diagram with the reversed comparison direction may include visually identifying graphical objects previously visually identified as added graphical objects as deleted graphical objects and/or visually identifying graphical objects previously visually identified as deleted graphical objects as added graphical objects, as described with respect to e.g., FIGS. 3A and 3B. In some embodiments, altering the comparison graphical diagram to display the comparison graphical diagram with the reversed comparison direction may include: displaying a reversed altered version of the first graphical diagram in which the differences between the first graphical diagram and the second graphical diagram are changed to differences between the second graphical diagram and the first graphical diagram (e.g., the starting point and ending point of the comparison are reversed); and simultaneously displaying a reversed altered version of the second graphical diagram in which the differences between the first graphical diagram and the second graphical diagram are changed to differences between the second graphical diagram and the first graphical diagram (e.g., the starting point and ending point of the comparison are reversed), as illustrated in and described with respect to FIG. 3B.

When comparing two versions of the same graphical diagram document, the order in time of the two versions may be consistently determined by comparing reference points in time of each diagram document. The version with the earlier/older reference point in time may be taken as the first graphical diagram while the version with the later/younger reference point in time may be taken as the second graphical diagram. In these and other embodiments, the use of comparison direction may be skipped.

In embodiments in which the comparison graphical diagram includes altered versions of the first and second graphical diagrams, the method 400 may further include synchronizing scrolling between the altered version of the first graphical diagram and the altered version of the second graphical diagram, including: in response to a user scrolling through the altered version of the first graphical diagram, automatically scrolling through the altered version of the second graphical diagram consistent with the user scrolling through the altered version of the first graphical diagram; and in response to the user scrolling through the altered version of the second graphical diagram, automatically scrolling through the altered version of the first graphical diagram consistent with the user scrolling through the altered version of the second graphical diagram. For example, as described with respect to FIGS. 3A-3C, if a user scrolls or otherwise navigates within the comparison graphical diagram 306A (or 308A) to a particular graphical object, the comparison graphical diagram 308A (or 306A) may automatically scroll or otherwise navigate automatically to the same graphical object (if the particular graphical object is part of a matched pair) and/or to a same or approximately same location (if the particular graphical object is not part of a matched pair).

In some embodiments, the first graphical diagram is included in a first document and the second graphical diagram is included in a second document. In these and other embodiments, the method 400 may further include, prior to comparing the first set to the second set, serializing each of the first document and the second document to facilitate the comparing. Serializing each of the first graphical diagram document and the second graphical diagram document may include extracting the one or more identifying properties from a storage format of the first graphical diagram document and the second graphical diagram document. For instance, the storage format of graphical diagram documents may intermix text formatting with text of graphical objects and the text formatting may interfere with and/or not be relevant to determining whether two graphical objects of different graphical diagrams are part of a matched pair. Thus, serializing the first and second graphical diagram documents in this example may include extracting from the storage format of the documents the text of graphical objects independent of the text formatting.

Alternatively or additionally, the method 400 may further include categorizing each of the differences between the first and second graphical diagrams into a corresponding one of multiple difference categories. The method 400 may further include receiving input effective to turn off one of the difference categories. The method 400 may further include altering the comparison graphical diagram to stop visually identifying differences categorized in the turned off difference category. An example of the foregoing is described with respect to FIG. 2E.

In some embodiments, the comparison graphical diagram includes one or more unchanged graphical objects corresponding to one or more matched pairs in which the given graphical object of the first set is identical to the given graphical object of the second set. In these and other embodiments, displaying the comparison graphical diagram at block 410 may include deemphasizing the one or more unchanged graphical objects relative to the differences. Deemphasizing the one or more unchanged graphical objects may include greying out the unchanged graphical objects.

The method 400 may further include displaying a panel near a graphical drawing canvas in which the comparison graphical diagram is displayed. The panel may list one or more of the differences between the first and second graphical diagrams. For example, the differences between the first and second graphical diagrams may be listed in a panel such as the panel 204, 304 of FIGS. 2A-3C. The list of differences may be accessed by opening a corresponding drop-down list, such as one of the drop-down lists 234, 236 of FIGS. 2C and 2D, or providing other suitable input. One of the differences may include a difference between metadata of the given graphical object of the first set and of the given graphical object of the second set of one of the matched pairs, such as a difference in the bpmnTaskType attribute in the metadata 320 of the graphical object 317 in the graphical diagram represented by the comparison graphical diagram 306A and in the metadata 322 of the graphical object 317 in the graphical diagram represented by the comparison graphical diagram 308A, where the graphical object 317 in the graphical diagram represented by the comparison graphical diagram 306A and the graphical object 317 in the graphical diagram represented by the comparison graphical diagram 308A are a matched pair. The difference between metadata may be visually identified by highlighting in the comparison graphical diagram one or both of the given graphical object of the first set or the given graphical object of the second set. For instance, as illustrated in FIG. 3C, the graphical object 317 in each of the comparison graphical diagrams 306A, 308A is highlighted with the same outline line type and includes the metadata edited object icon 317. Moreover, the difference between metadata may be displayed in the panel. For example, as illustrated in FIG. 3C, the metadata 320, 322 is displayed in the panel 304 with the bpmnTaskType attribute highlighted.

Some embodiments of the method 400 and/or other methods to compare graphical diagrams as described herein may implement heuristics that take advantage of partial or incomplete matches, of sufficient strength, to create matched pairs. Alternatively or additionally, matching logic (such as may be implemented at block 402 and/or block 404) may uniquely and consistently, e.g., deterministically, identify a single graphical object from each graphical diagram as a match. For example, when a graphical object in one graphical diagram is matched to a graphical object in another graphical diagram, one and only one match is identified. With other matching steps, such as comparing text on graphical objects or other similar comparisons, the matching logic may result in a nondeterministic match result, with multiple graphical objects being identified as possibly matching under that condition from either or each graphical diagram document. For example, one or multiple graphical objects from the first graphical diagram may be matched to one or more multiple graphical objects from the second graphical diagram. Once identified, the set of three or more matching graphical objects (e.g., two or more from one of the graphical diagrams and one or more from the other of the graphical diagrams) may be retained as the set for presenting with the results, or may be divided using additional constrains or even arbitrarily such that specific pairings of graphical objects are presented with the results.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 400 may be combined with one or more other methods and processes described herein and/or steps or operations of the method 400 may be substituted for steps or operations of one or more other methods and processes, or vice versa.

Figure 5A:
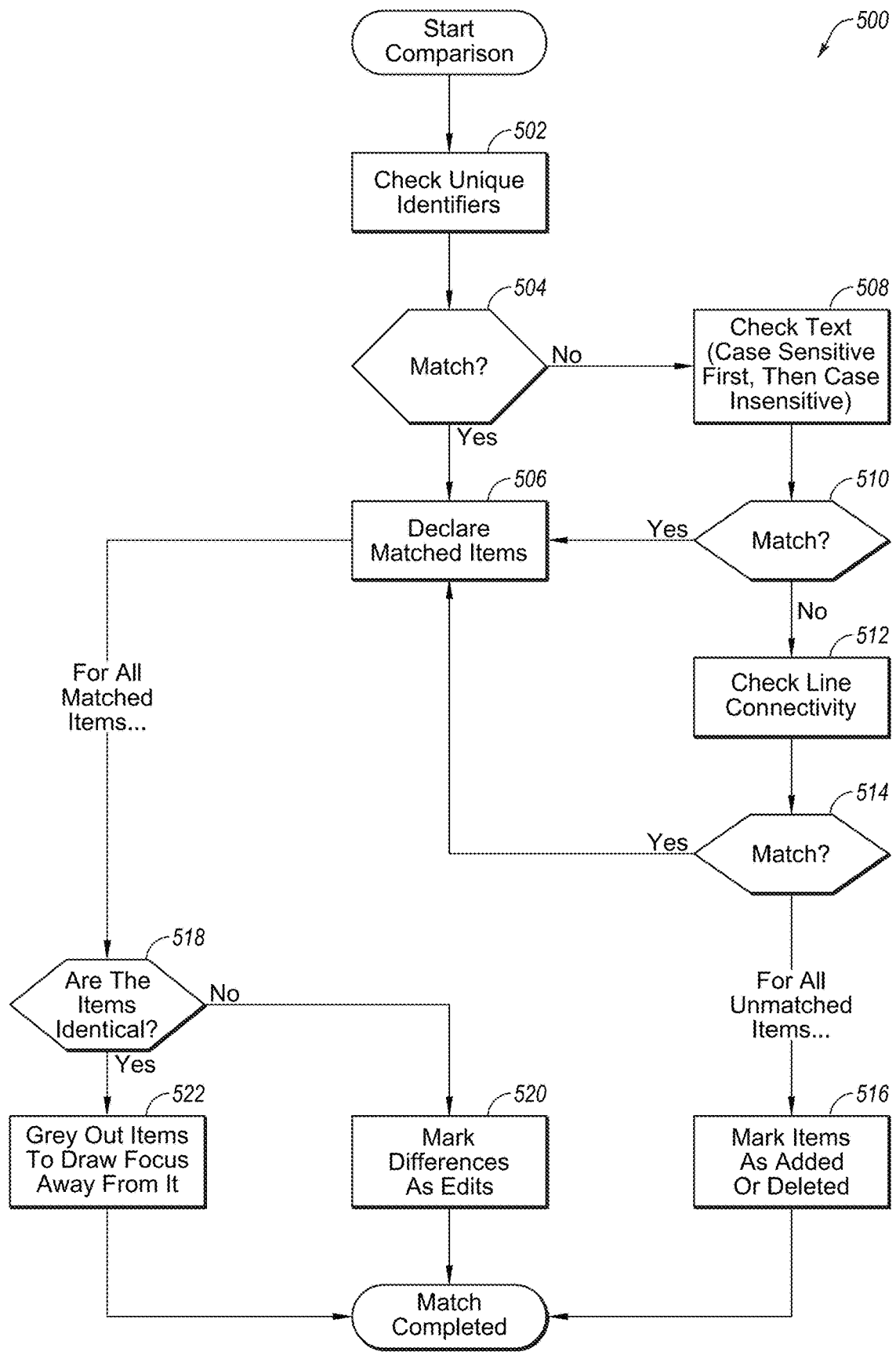
FIG. 5A illustrates a flowchart of another example method to compare graphical diagrams.

FIG. 5A illustrates a flowchart of another example method 500 to compare graphical diagrams, arranged in accordance with at least one embodiment described herein. The method 500 may be directly performed on two graphical diagrams, on two graphical diagram documents that each include one or more graphical diagrams, on a graphical diagram and a graphical diagram document that includes at least one graphical diagram, or on two versions of the same graphical diagram or graphical diagram document. Each of the foregoing use cases involves the comparison of two graphical diagrams (e.g., two versions of the same graphical diagram document, a graphical diagram and a graphical diagram document that includes a graphical diagram, etc.) and the discussion that follows accordingly describes the comparison of graphical diagrams. The method 500 may be performed by any suitable system, apparatus, or device. For example, any one or more of the client devices 104, 106, 108, the diagram application 114, and/or the server 102 of FIG. 1 may perform or direct performance of one or more of the operations associated with the method 400. In these and other embodiments, the method 500 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 500 or one or more operations thereof. The method 500 may include one or more of blocks 502, 504, 506, 508, 510, 512, 514, 516, 518, 520, and/or 522.

At block 502, the method 500 may include comparing unique IDs of graphical objects of a first set of graphical objects (e.g., of a first diagram or first diagram document) to unique IDs of graphical objects of a second set of graphical objects (e.g., of a second diagram or second diagram document). In some embodiments, all graphical objects of the first and second sets are initially grouped as or considered to be unmatched graphical objects such that step 502 may include comparing unique IDs of unmatched graphical objects of the first set to unique IDs of unmatched graphical objects of the second set. Block 502 may be followed by block 504.

At block 504, the method 500 may include determining whether the unique ID of an unmatched graphical object of the first set matches the unique ID of an unmatched graphical object of the second set. The comparison and determination of matching of unique IDs may compare the unique ID of a given unmatched graphical object of the first set to unique IDs of the unmatched graphical objects of the second set in sequence, e.g., until a match is found at block 504 or until the unique ID of the given unmatched graphical object of the first set is compared to unique IDs of all of the unmatched graphical objects of the second set without finding a match at block 504. In more detail, at block 502, the unique ID of a first unmatched graphical object of the first set may be compared to the unique ID of a first unmatched graphical object of the second set. If the unique IDs do not match at block 504, the unique ID of the first unmatched graphical object of the first set may then be compared at block 502 to the unique ID of a second unmatched graphical object of the second set. If the unique IDs do not match again at block 504, the unique ID of the first unmatched graphical object of the first set may then be compared at block 502 to the unique ID of a third unmatched graphical object of the second set. The comparison at block 502 and determination of whether there is a match at block 504 may repeat (e.g., taking a different unmatched graphical object of the second set each time) until a match is found or until the unique ID of the first graphical object of the first set has been compared to the unique IDs of all unmatched graphical objects of the second set without finding a match. The process may then cycle through each of the unmatched graphical objects of the first set in the same manner (e.g., comparing the unique ID of a given unmatched graphical object of the first set to unique IDs of unmatched graphical objects of the second set in sequence, e.g., until a match is found or the unique ID of the given graphical object of the first set is compared to unique IDs of all of the graphical objects of the second set without finding a match). When a unique ID of a given unmatched graphical object of the first set matches a unique ID of a given unmatched graphical object of the second set ("Yes" at block 504), the given graphical objects of the first and second sets may be declared a matched pair at block 506. Graphical objects declared as a matched pair may be removed from the group of unmatched graphical objects which may, e.g., reduce processing overhead for subsequent comparison stages (e.g., block 508, 512). For any graphical objects of the first and second sets that remain unmatched after the comparison of unique IDs ("No" at block 504), the method 500 may proceed to block 508.

At block 508, the method 500 may include comparing text of unmatched graphical objects of the first set to text of unmatched graphical objects of the second set. The text comparison at block 508 may be case sensitive or case insensitive. Alternatively, the text comparison at block 508 may be subdivided into two comparison steps, including a case sensitive text comparison and a case insensitive text comparison. In some embodiments, comparing text of unmatched graphical objects, or other comparison steps or stages described herein, may filter out graphical objects that are already known not to be a match or that fail to satisfy a prerequisite for a comparison. For example, any graphical object that lacks text may be filtered out, ignored, disregarded, or otherwise bypassed at block 508 since the absence of any text means the graphical object will not be match to any graphical object that includes text. As another graphical object, any comparison step or stage that compares a particular property of one graphical object to another may bypass any graphical objects that lack the property. Alternatively or additionally, comparing text and/or other comparison steps or stages may identify a non-deterministic set of three or more graphical objects that match. Block 508 may be followed by block 510.

At block 510, the method 500 may include determining whether the text of an unmatched graphical object of the first set matches the text of an unmatched graphical object of the second set. The comparison and determination of matching of text may compare the unique ID of a given unmatched graphical object of the first set to text of the unmatched graphical objects of the second set in sequence, e.g., until a match is found at block 510 or until the text of the given unmatched graphical object of the first set is compared to text of all of the unmatched graphical objects of the second set without finding a match at block 510. In more detail, at block 508, the text of a first unmatched graphical object of the first set may be compared to the text of a first unmatched graphical object of the second set. If the texts do not match at block 510, the text of the first unmatched graphical object of the first set may then be compared at block 508 to the text of a second unmatched graphical object of the second set. If the texts do not match again at block 510, the text of the first unmatched graphical object of the first set may then be compared at block 508 to the text of a third unmatched graphical object of the second set. The comparison at block 508 and determination of whether there is a match at block 510 may repeat in this manner (e.g., taking a different unmatched graphical object of the second set each time) until a match is found or until the text of the first graphical object of the first set has been compared to the texts of all unmatched graphical objects of the second set without finding a match. The process may then cycle through each of the unmatched graphical objects of the first set in the same manner (e.g., comparing the text of a given unmatched graphical object of the first set to texts of unmatched graphical objects of the second set in sequence, e.g., until a match is found or the text of the given graphical object of the first set is compared to texts of all of the graphical objects of the second set without finding a match). When text of a given unmatched graphical object of the first set matches text of a given unmatched graphical object of the second set ("Yes" at block 510), the given graphical objects of the first and second sets may be declared a matched pair at block 506. As already indicated, graphical objects declared as a matched pair may be removed from the group of unmatched graphical objects which may, e.g., reduce processing overhead for subsequent comparison stages (e.g., block 512). For any graphical objects of the first and second sets that remain unmatched after the comparison of texts ("No" at block 510), the method 500 may proceed to block 508.

At block 512, the method 500 may include comparing endpoints of unmatched connector graphical objects of the first set to endpoints of unmatched connector graphical objects of the second set. Block 512 may be followed by block 514. The endpoints refer to the graphical objects at each end of, e.g., that are connected by, a connector graphical object.

At block 514, the method 500 may include determining whether the endpoints of an unmatched connector graphical object of the first set match the endpoints of an unmatched connector graphical object of the second set. The endpoints of an unmatched connector graphical object of the first set may match the endpoints of an unmatched connector graphical object of the second set when each of the graphical objects at the ends of the unmatched connector graphical object of the first set is part of a matched pair with a corresponding graphical object at a corresponding end of the unmatched connector graphical object of the second set. That is, if the graphical objects at one end of an unmatched connector graphical object of the first set and an unmatched connector graphical object of the second set are a matched pair, and if the graphical objects at the other end of the unmatched connector graphical object of the first set and the unmatched connector graphical object of the second set are a matched pair, then unmatched connector graphical objects of the first and second sets may be determined to match. The comparison and determination of matching of endpoints may compare the endpoints of a given unmatched connector graphical object of the first set to endpoints of the unmatched connector graphical objects of the second set in sequence, e.g., until a match is found at block 514 or until the endpoints of the given unmatched connector graphical object of the first set are compared to endpoints of all of the unmatched connector graphical objects of the second set without finding a match at block 514. In more detail, at block 512, the endpoints of a first unmatched connector graphical object of the first set may be compared to the endpoints of a first unmatched connector graphical object of the second set. If the endpoints do not match at block 514, the endpoints of the first unmatched connector graphical object of the first set may then be compared at block 512 to the endpoints of a second unmatched connector graphical object of the second set. If the endpoints do not match again at block 514, the endpoints of the first unmatched connector graphical object of the first set may then be compared at block 512 to the endpoints of a third unmatched connector graphical object of the second set. The comparison at block 512 and determination of whether there is a match at block 514 may repeat in this manner (e.g., taking a different unmatched connector graphical object of the second set each time) until a match is found or until the endpoints of the first connector graphical object of the first set have been compared to the endpoints of all unmatched connector graphical objects of the second set without finding a match. The process may then cycle through each of the unmatched graphical objects of the first set in the same manner (e.g., comparing the endpoints of a given unmatched graphical object of the first set to unique IDs of unmatched graphical objects of the second set in sequence, e.g., until a match is found or the endpoints of the given graphical object of the first set are compared to endpoints of all of the graphical objects of the second set without finding a match). When endpoints of a given unmatched connector graphical object of the first set match endpoints of a given unmatched connector graphical object of the second set ("Yes" at block 514), the given connector graphical objects of the first and second sets may be declared a matched pair at block 506. As already indicated, connector graphical objects declared as a matched pair may be removed from the group of unmatched connector graphical objects. For any connector graphical objects of the first and second sets that remain unmatched after the comparison of endpoints ("For all unmatched items" at block 514), the method 500 may proceed to block 516.

At block 516, the method 500 may include marking (or categorizing) each of the unmatched graphical objects as an added graphical object or a deleted graphical object. An unmatched graphical object may be marked as a deleted graphical object if it is present in a first graphical diagram and absent from a second graphical diagram to which the first graphical diagram is being compared. An unmatched graphical object may be marked as an added graphical object if it is absent from the first graphical diagram and present in the second graphical diagram to which the first graphical diagram is being compared.

As previously indicated, and in response to one or more identifying properties (e.g., unique ID, text, endpoints) of a given graphical object of the first set matching the same one or more identifying properties of a given graphical object of the second set at block 504, 510, or 514, the given graphical object of the first set and the given graphical object of the second set may be declared a matched pair. Block 506 may be followed by block 518.

At block 518, it may be determined whether the two graphical objects included in each matched pair are identical. If the two graphical objects in a given matched pair are not identical ("No" at block 518), one or more differences between the two graphical objects may be identified and marked (or categorized) as one or more edits in block 520. If the two graphical objects in a given matched pair are identical ("Yes" at block 518), the matched pair may be marked (or categorized) as unchanged at block 522.

Although not illustrated in FIG. 5A, block 516, block 520, and/or block 522 may be followed by generating and displaying a comparison graphical diagram that visually identifies differences between the first and second graphical diagrams. Graphical objects may be visually identified in the comparison graphical diagram as being or including a difference between the two compared graphical diagrams, or not, based on their marking (or categorization) at one or more of blocks 516, 520, or 522. The differences may include at least one of one or more deleted graphical objects or one or more added graphical objects. Alternatively or additionally, graphical objects marked as unchanged or identical at block 522 may be greyed out or otherwise deemphasized in the comparison graphical diagram.

Blocks 502, 504, 508, 510, 512, and/or 514 are examples of multiple sequential comparing stages that may be included in or correspond to block 402 of FIG. 4. In some embodiments, the comparison step or multiple sequential comparing stages may only compare unmatched graphical items that are the same type. For instance, unmatched decision block graphical objects, terminator block graphical objects, or connector graphical objects in the first set may only be compared in a given comparison step or comparing stage to, respectively, unmatched decision block graphical objects, terminator block graphical objects, or connector graphical objects in the second set. Block 516 may include, be included in, or correspond to one or both of blocks 406 or 408 of FIG. 4.

Figure 5B:
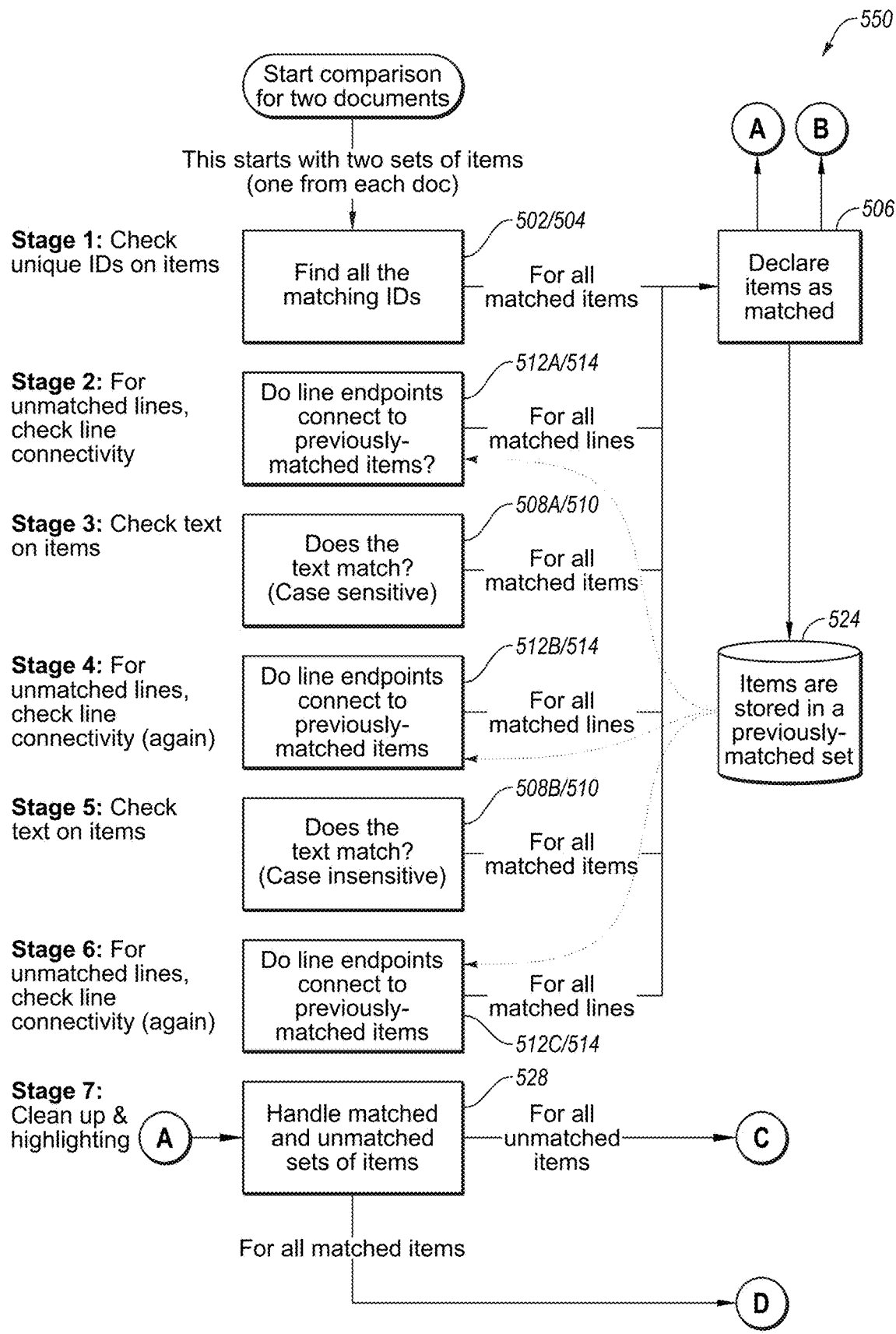
FIGS. 5B and 5C illustrate a flowchart of another example method to compare graphical diagrams.
Figure 5C:
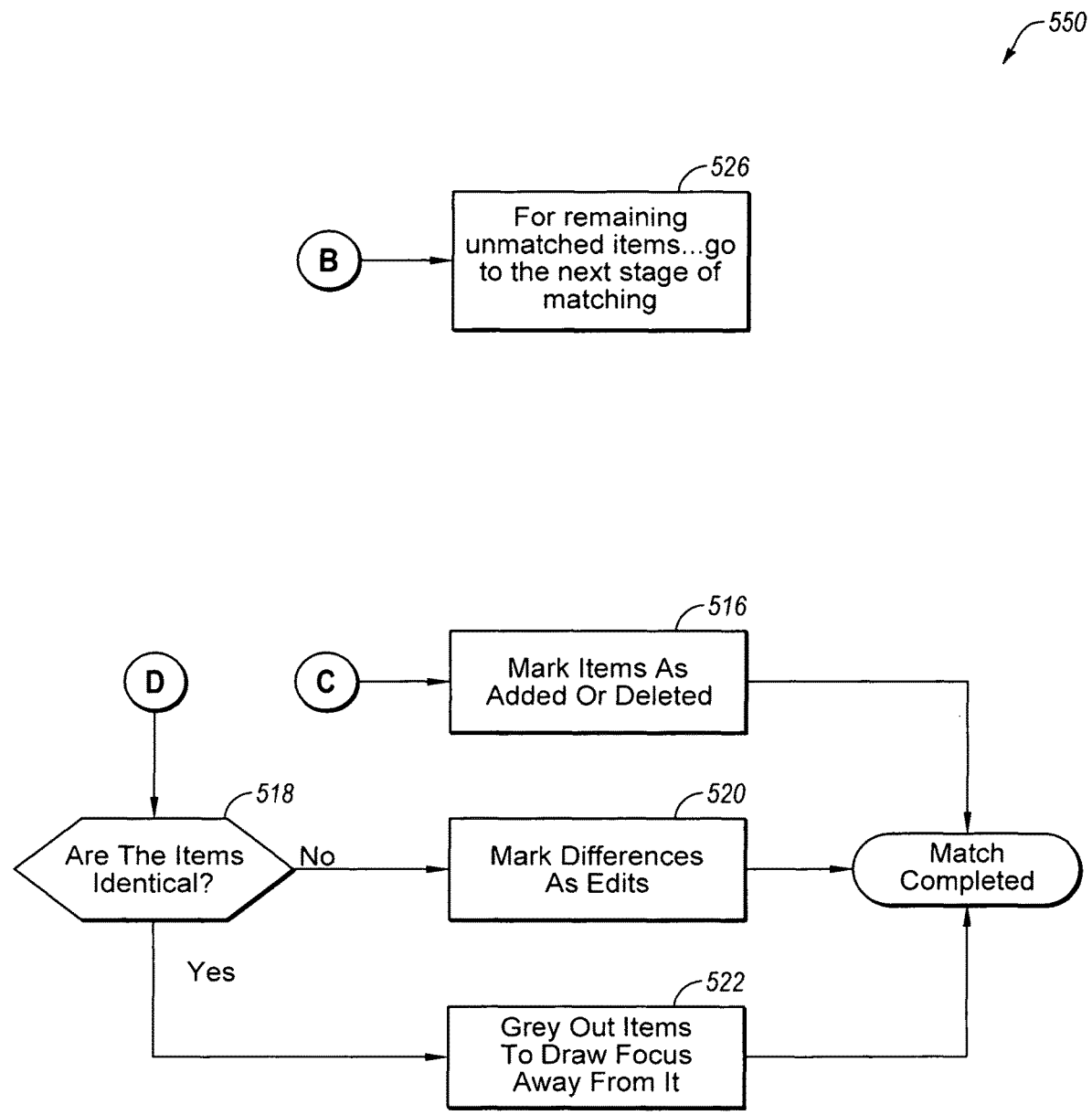

FIGS. 5B and 5C illustrate a flowchart of another example method 550 to compare graphical diagrams, arranged in accordance with at least one embodiment described herein. The method 550 may be directly performed on two graphical diagrams, on two graphical diagram documents that each include one or more graphical diagrams, on a graphical diagram and a graphical diagram document that includes at least one graphical diagram, or on two versions of the same graphical diagram or graphical diagram document. Each of the foregoing use cases involves the comparison of two graphical diagrams (e.g., two versions of the same graphical diagram document, a graphical diagram and a graphical diagram document that includes a graphical diagram, etc.) and the discussion that follows accordingly describes the comparison of graphical diagrams. The method 550 may be performed by any suitable system, apparatus, or device. For example, any one or more of the client devices 104, 106, 108, the diagram application 114, and/or the server 102 of FIG. 1 may perform or direct performance of one or more of the operations associated with the method 400. In these and other embodiments, the method 500 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 550 or one or more operations thereof. The method 550 illustrates a modified alternative way of visualizing the method 500 of FIG. 5A.

In more detail, the method 550 may include at block 502/504 comparing unique IDs of graphical objects of a first set of graphical objects (e.g., of a first diagram or first diagram document) to unique IDs of graphical objects of a second set of graphical objects (e.g., of a second diagram or second diagram document) and determining whether the unique ID of a given unmatched graphical object of the first set matches the unique ID of a given unmatched graphical object of the second set. Block 502/504 in the method 550 may be implemented in the same or similar manner as blocks 502 and 504 in the method 500. Graphical objects declared as a matched pair at block 506 following block 502/504 are removed from a group of unmatched graphical objects. When a given graphical object of the first set and a given graphical object of the second set are declared a matched pair at block 506 following block 502/504, the matched pair of the given graphical objects of the first and second sets may be stored in storage 524 for subsequent endpoint comparison (e.g., block 512A/514). After completing block 502/504, the method 550 may proceed to block 512A/514 as indicated at block 526.

At block 512A/514, the method 550 may include comparing endpoints of unmatched connector graphical objects of the first set to endpoints of unmatched connector graphical objects of the second set and determining whether the endpoints of a given unmatched connector graphical object of the first set match the endpoints of a given unmatched connector graphical object of the second set. Block 512A/514 may analyze the storage 524 to identify endpoints in the first and second sets that have been declared matched pairs to determine whether the endpoints of a given unmatched connector graphical object in the first set and the endpoints of a given unmatched connector graphical object in the second set match. Block 512A/514 in the method 550 may be implemented in the same or similar manner as blocks 512 and 514 in the method 500. Connector graphical objects declared as a matched pair at block 506 following block 512A/514 are removed from the group of unmatched graphical objects. After completing block 512A/514, the method 550 may proceed to block 508A/510 as indicated at block 526.

At block 508A/510, the method 550 may include case sensitive comparing of text of unmatched graphical objects of the first set to text of unmatched graphical objects of the second set and determining whether the text of a given or multiple unmatched graphical objects of the first set match the text of a given or multiple unmatched graphical objects of the second set. Block 508A/510 in the method 550 may be implemented in the same or similar manner as blocks 508 and 510 in the method 500. Graphical objects declared as a matched pair or matched set at block 506 following block 508A/510 are removed from the group of unmatched graphical objects. When a given or multiple graphical objects of the first set and a given or multiple graphical objects of the second set are declared a matched pair or matched set at block 506 following block 508A/510, the matched pair or the matched set of the given or multiple graphical objects of the first and second sets may be stored in storage 524 for subsequent endpoint comparison (e.g., block 512B/514). After completing block 508A/510, the method 550 may proceed to block 512B/514 as indicated at block 526.

At block 512B/514, the method 550 may include comparing endpoints of unmatched connector graphical objects of the first set to endpoints of unmatched connector graphical objects of the second set and determining whether the endpoints of a given unmatched connector graphical object of the first set match the endpoints of a given unmatched connector graphical object of the second set. Block 512B/514 may analyze the storage 524 to identify endpoints in the first and second sets that have been declared matched pairs to determine whether the endpoints of a given unmatched connector graphical object in the first set and the endpoints of a given unmatched connector graphical object in the second set match. Block 512B/514 in the method 550 may be implemented in the same or similar manner as blocks 512 and 514 in the method 500. Connector graphical objects declared as a matched pair at block 506 following block 512B/514 are removed from the group of unmatched graphical objects. After completing block 512B/514, the method 550 may proceed to block 508B/510 as indicated at block 526.

At block 508B/510, the method 550 may include case insensitive comparing of text of unmatched graphical objects of the first set to text of unmatched graphical objects of the second set and determining whether the text of a given or multiple unmatched graphical objects of the first set match the text of a given or multiple unmatched graphical objects of the second set. Block 508B/510 in the method 550 may be implemented in the same or similar manner as blocks 508 and 510 in the method 500. Graphical objects declared as a matched pair or matched set at block 506 following block 508B/510 are removed from the group of unmatched graphical objects. When a given or multiple graphical objects of the first set and a given or multiple graphical objects of the second set are declared a matched pair or matched set at block 506 following block 508B/510, the matched pair or the matched set of the given or multiple graphical objects of the first and second sets may be stored in storage 524 for subsequent endpoint comparison (e.g., block 512C/514). After completing block 508B/510, the method 550 may proceed to block 512C/514 as indicated at block 526.

At block 512C/514, the method 550 may include comparing endpoints of unmatched connector graphical objects of the first set to endpoints of unmatched connector graphical objects of the second set and determining whether the endpoints of a given unmatched connector graphical object of the first set match the endpoints of a given unmatched connector graphical object of the second set. Block 512C/514 may analyze the storage 524 to identify endpoints in the first and second sets that have been declared matched pairs to determine whether the endpoints of a given unmatched connector graphical object in the first set and the endpoints of a given unmatched connector graphical object in the second set match. Block 512C/514 in the method 550 may be implemented in the same or similar manner as blocks 512 and 514 in the method 500. Connector graphical objects declared as a matched pair at block 506 following block 512C/514 are removed from the group of unmatched graphical objects. After completing block 506 following block 512C/514, the method 550 may proceed to block 528.

At block 528, the method 550 may include handling matched graphical objects (e.g., graphical objects belonging to matched pairs) and unmatched graphical objects as described with respect to FIG. 5. For example, unmatched graphical objects may be marked as added or deleted at block 516, while matched graphical objects may be analyzed to determine at block 518 if the graphical objects of a given matched pair are identical and graphical objects of a given matched pair that are identical are marked as such at block 522 while graphical objects of a given matched pair that are not identical are marked as edits at block 520.

Figure 6:
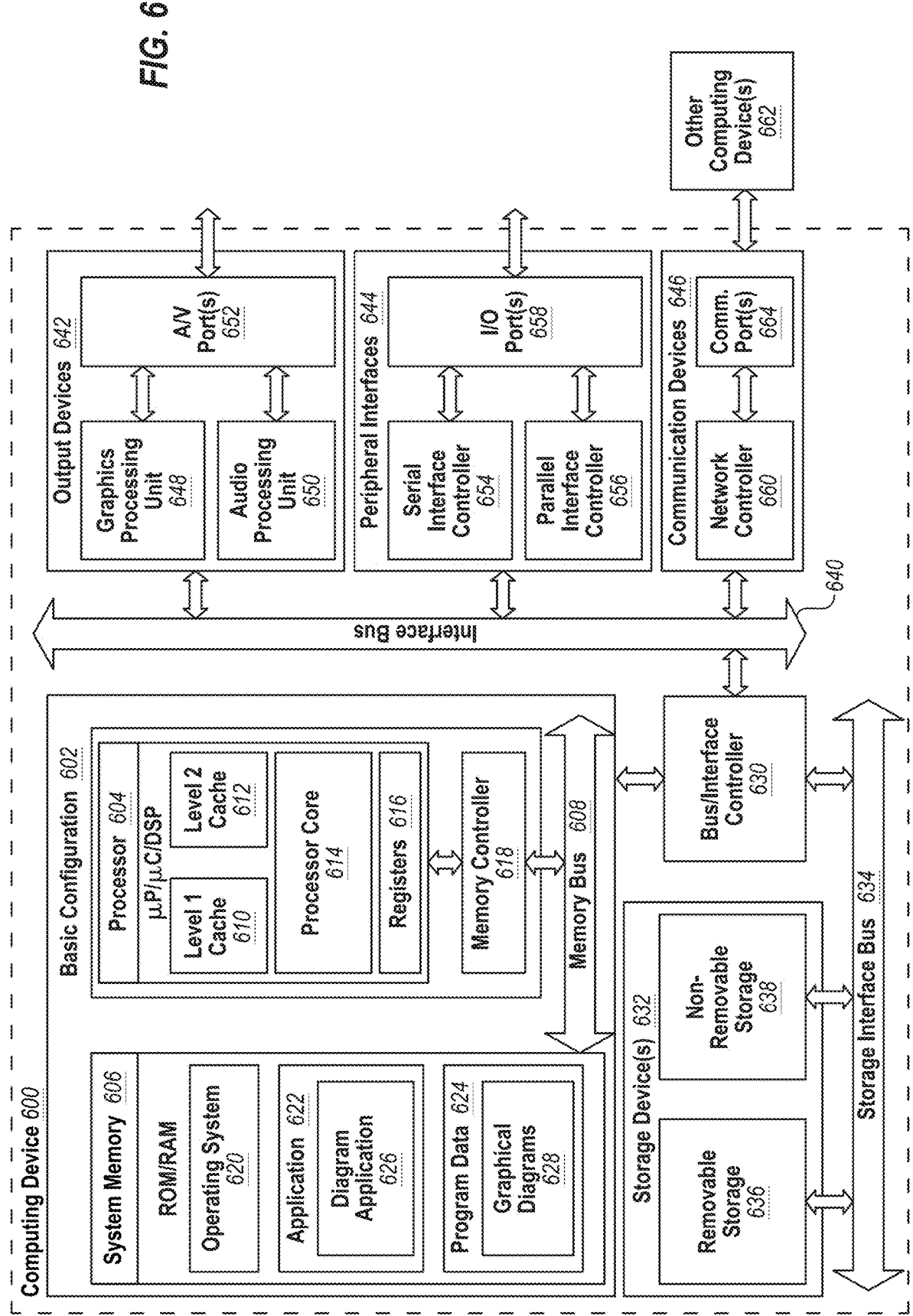
FIG. 6 is a block diagram illustrating an example computing device that is arranged to compare graphical diagrams, all arranged in accordance with at least one embodiment described herein.

FIG. 6 is a block diagram illustrating an example computing device 600 that is arranged to compare graphical diagrams, arranged in accordance with at least one embodiment described herein. The computing device 600 may include, be included in, or otherwise correspond to either or both of the server 102 or the client devices 104, 106, 108 of FIG. 1. In a basic configuration 602, the computing device 600 typically includes one or more processors 604 and a system memory 606. A memory bus 608 may be used to communicate between the processor 604 and the system memory 606.

Depending on the desired configuration, the processor 604 may be of any type including, but not limited to, a microprocessor ($\mu$P), a microcontroller ($\mu$C), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may include an internal part of the processor 604.

Depending on the desired configuration, the system memory 606 may be of any type including volatile memory (such as RAM), nonvolatile memory (such as ROM, flash memory, etc.), or any combination thereof. The system memory 606 may include an operating system 620, one or more applications 622, and program data 624. The application 622 may include a diagram application 626 that is arranged to generate, display, and/or compare graphical diagrams. The diagram application 626 may include, be included in, or otherwise correspond to the diagram application 114 of FIG. 1. The program data 624 may include graphical diagram documents 628 (which may include, be included in, or otherwise correspond to the graphical diagram documents 126 of FIG. 1) as is described herein, structured source data collections (such as structured source data 120 of FIG. 1), models of structured source data (such as models 122 of FIG. 1), comparison heuristics and/or rules such as may be implemented at one or more of blocks 402, 502, 504, 508, 510, 512, 514, 502/504, 512A/514, 508A/510, 512B/514, 508B/510, 512C/514 of FIGS. 4-5C, and/or other graphical data. In some embodiments, the application 622 may be arranged to operate with the program data 624 on the operating system 620 such that one or more methods may be provided as described herein.

The computing device 600 may have additional features or functionality, and additional interfaces to facilitate communications between the basic configuration 602 and any involved devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 600. Any such computer storage media or non-transitory computer-readable media may be part of the computing device 600.

The computing device 600 may also include an interface bus 640 to facilitate communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. Diagrams, flowcharts, organizational charts, connectors, and/or other graphical objects generated by the diagram application 626 may be output through the graphics processing unit 648 to such a display. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. Such input devices may be operated by a user to provide input to the diagram application 626, which input may be effective to, e.g., generate curved connectors, designate points as designated points of one or more curved connectors, relocate one or more designated points, and/or to accomplish other operations within the diagram application 626. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a smartphone, a personal data assistant (PDA) or an application-specific device. The computing device 600 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to compare graphical diagrams, the method comprising:
   comparing a first set of graphical objects of a first graphical diagram to a second set of graphical objects of a second graphical diagram;
   in response to one or more identifying properties of a given graphical object of the first set matching one or more identifying properties of a given graphical object of the second set, declaring the given graphical object of the first set and the given graphical object of the second set a matched pair;
   marking each graphical object of the first set that is unmatched to any graphical object in the second set a deleted graphical object;
   marking each graphical object of the second set that is unmatched to any graphical object in the first set an added graphical object; and
   generating and displaying a comparison graphical diagram that visually identifies differences between the first and second graphical diagrams, the differences including at least one of: one or more deleted graphical objects or one or more added graphical objects,
   wherein:
      comparing the first set to the second set comprises comparing the first set to the second set in multiple sequential comparing stages;
      at each comparing stage, each graphical object of the first and second sets that has been declared as part of a matched pair is removed from a group of unmatched graphical objects and unmatched graphical objects of the first set in the group are compared to unmatched graphical objects of the second set in the group;
      comparing the first set to the second set in multiple sequential comparing stages includes comparing of metadata of the unmatched graphical objects of the first set to metadata of the unmatched graphical objects of the second set, none of the metadata being displayed in any of the graphical diagrams; and
      comparing the first set to the second set in multiple sequential comparing stages further includes comparing unique identifiers of the unmatched graphical objects of the first set to unique identifiers of the unmatched graphical objects of the second set.

2. The method of claim 1, wherein:
   the method further comprises, for each matched pair, determining whether the given graphical object of the first set is identical to the given graphical object of the second set; and
   the differences between the first and second graphical diagrams visually identified in the comparison graphical diagram further include an edit for each matched pair in which the given graphical object of the first set is not identical to the given graphical object of the second set.

3. A method to compare graphical diagrams, the method comprising:
   comparing a first set of graphical objects of a first graphical diagram to a second set of graphical objects of a second graphical diagram;
   in response to one or more identifying properties of a given graphical object of the first set matching one or more identifying properties of a given graphical object of the second set, declaring the given graphical object of the first set and the given graphical object of the second set a matched pair;
   marking each graphical object of the first set that is unmatched to any graphical object in the second set a deleted graphical object;
   marking each graphical object of the second set that is unmatched to any graphical object in the first set an added graphical object; and
   generating and displaying a comparison graphical diagram that visually identifies differences between the first and second graphical diagrams, the differences including at least one of: one or more deleted graphical objects or one or more added graphical objects,
   wherein:
      comparing the first set to the second set comprises comparing the first set to the second set in multiple sequential comparing stages;
      at each comparing stage, each graphical object of the first and second sets that has been declared as part of a matched pair is removed from a group of unmatched graphical objects and unmatched graphical objects of the first set in the group are compared to unmatched graphical objects of the second set in the group;
      comparing the first set to the second set in multiple sequential comparing stages includes comparing of metadata of the unmatched graphical objects of the first set to metadata of the unmatched graphical objects of the second set, none of the metadata being displayed in any of the graphical diagrams; and
      comparing the first set to the second set in multiple sequential comparing stages further includes case sensitive comparing of text of the unmatched graphical objects of the first set to text of the unmatched graphical objects of the second set.

4. The method of claim 1, wherein comparing the first set to the second set in multiple sequential comparing stages further includes at least one of:
   comparing of data attached to the unmatched graphical objects of the first set to data attached to the unmatched graphical objects of the second set;
   comparing shapes of the unmatched graphical objects of the first set to shapes of the unmatched graphical objects of the second set;
   comparing sizes of the unmatched graphical objects of the first set to sizes of the unmatched graphical objects of the second set; or
   comparing of text of the unmatched graphical objects of the first set to text of the unmatched graphical objects of the second set.

5. The method of claim 1, wherein displaying the comparison graphical diagram includes:

displaying an altered version of the first graphical diagram in which differences between the first graphical diagram and the second graphical diagram are visually identified; and simultaneously displaying an altered version of the second graphical diagram in which differences between the first graphical diagram and the second graphical diagram are visually identified.

6. The method of claim 5, further comprising receiving input effective to reverse a comparison direction between the first and second graphical diagrams and altering the comparison graphical diagram to display the comparison graphical diagram with the reversed comparison direction.

7. The method of claim 6, wherein altering the comparison graphical diagram to display the comparison graphical diagram with the reversed comparison direction includes:

displaying a reversed altered version of the first graphical diagram in which the differences between the first graphical diagram and the second graphical diagram are changed to differences between the second graphical diagram and the first graphical diagram; and simultaneously displaying a reversed altered version of the second graphical diagram in which the differences between the first graphical diagram and the second graphical diagram are changed to differences between the second graphical diagram and the first graphical diagram.

8. The method of claim 5, further comprising, synchronizing scrolling between the altered version of the first graphical diagram and the altered version of the second graphical diagram, including:

in response to a user scrolling through the altered version of the first graphical diagram, automatically scrolling through the altered version of the second graphical diagram consistent with the user scrolling through the altered version of the first graphical diagram; and in response to the user scrolling through the altered version of the second graphical diagram, automatically scrolling through the altered version of the first graphical diagram consistent with the user scrolling through the altered version of the second graphical diagram.

9. The method of claim 1, wherein the first graphical diagram is included in a first graphical diagram document and the second graphical diagram is included in a second graphical diagram document, the method further comprising, prior to comparing the first set to the second set, serializing each of the first graphical diagram document and the second graphical diagram document to facilitate the comparing.

10. The method of claim 1, further comprising:
categorizing each of the differences between the first and second graphical diagrams into a corresponding one of multiple difference categories;
receiving input effective to turn off one of the difference categories; and
altering the comparison graphical diagram to stop visually identifying differences categorized in the turned off difference category.

11. The method of claim 1, wherein:
the comparison graphical diagram includes one or more unchanged graphical objects corresponding to one or more matched pairs in which the given graphical object of the first set is identical to the given graphical object of the second set; and
displaying the comparison graphical diagram includes deemphasizing the one or more unchanged graphical objects relative to the differences.

12. The method of claim 1, wherein the comparison graphical diagram is displayed in a graphical drawing canvas, the method further comprising displaying a panel near the graphical drawing canvas that lists the differences.

13. The method of claim 12, wherein:
one of the differences includes a difference between metadata of the given graphical object of the first set and of the given graphical object of the second set of one of the matched pairs;
the difference between metadata is visually identified by highlighting in the comparison graphical diagram one or both of the given graphical object of the first set or the given graphical object of the second set; and
the difference between metadata is displayed in the panel.

14. A non-transitory computer-readable medium having computer-readable instructions stored thereon that are executable by a processor to perform or control performance of operations comprising:

comparing a first set of graphical objects of a first graphical diagram to a second set of graphical objects of a second graphical diagram;

in response to one or more identifying properties of a given graphical object of the first set matching one or more identifying properties of a given graphical object of the second set, declaring the given graphical object of the first set and the given graphical object of the second set a matched pair;

marking each graphical object of the first set that is unmatched to any graphical object in the second set a deleted graphical object;

marking each graphical object of the second set that is unmatched to any graphical object in the first set an added graphical object; and generating and displaying a comparison graphical diagram that visually identifies differences between the first and second graphical diagrams, the differences including at least one of: one or more deleted graphical objects or one or more added graphical objects, wherein:
comparing the first set to the second set comprises comparing the first set to the second set in multiple sequential comparing stages;

at each comparing stage, each graphical object of the first and second sets that has been declared as part of a matched pair is removed from a group of unmatched graphical objects and unmatched graphical objects of the first set in the group are compared to unmatched graphical objects of the second set in the group;

comparing the first set to the second set in multiple sequential comparing stages includes comparing of metadata of the unmatched graphical objects of the first set to metadata of the unmatched graphical objects of the second set, none of the metadata being displayed in any of the graphical diagrams;

displaying the comparison graphical diagram includes:
displaying an altered version of the first graphical diagram in which differences between the first graphical diagram and the second graphical diagram are visually identified; and
simultaneously displaying an altered version of the second graphical diagram in which differences between the first graphical diagram and the second graphical diagram are visually identified; and the method further comprises receiving input effective to reverse a comparison direction between the first and second graphical diagrams and altering the comparison graphical diagram to display the comparison graphical diagram with the reversed comparison direction.

15. The non-transitory computer-readable medium of claim 14, wherein:
the operations further comprise, for each matched pair, determining whether the given graphical object of the first set is identical to the given graphical object of the second set; and
the differences between the first and second graphical diagrams visually identified in the comparison graphical diagram further include an edit for each matched pair in which the given graphical object of the first set is not identical to the given graphical object of the second set.

16. The non-transitory computer-readable medium of claim 14, the operations further comprising:
categorizing each of the differences between the first and second graphical diagrams into a corresponding one of multiple difference categories;
receiving input effective to turn off one of the difference categories; and
altering the comparison graphical diagram to stop visually identifying differences categorized in the turned off difference category.

17. The non-transitory computer-readable medium of claim 14, wherein:
the comparison graphical diagram includes one or more unchanged graphical objects corresponding to one or more matched pairs in which the given graphical object of the first set is identical to the given graphical object of the second set; and
displaying the comparison graphical diagram includes deemphasizing the one or more unchanged graphical objects relative to the differences.

18. A method to compare graphical diagrams, the method comprising:
comparing a first set of graphical objects of a first graphical diagram to a second set of graphical objects of a second graphical diagram;
in response to one or more identifying properties of a given graphical object of the first set matching one or more identifying properties of a given graphical object of the second set, declaring the given graphical object of the first set and the given graphical object of the second set a matched pair;
marking each graphical object of the first set that is unmatched to any graphical object in the second set a deleted graphical object;
marking each graphical object of the second set that is unmatched to any graphical object in the first set an added graphical object; and
generating and displaying a comparison graphical diagram that visually identifies differences between the first and second graphical diagrams, the differences including at least one of: one or more deleted graphical objects or one or more added graphical objects,
wherein:
comparing the first set to the second set comprises comparing the first set to the second set in multiple sequential comparing stages;
at each comparing stage, each graphical object of the first and second sets that has been declared as part of a matched pair is removed from a group of unmatched graphical objects and unmatched graphical objects of the first set in the group are compared to unmatched graphical objects of the second set in the group;
comparing the first set to the second set in multiple sequential comparing stages includes comparing of metadata of the unmatched graphical objects of the first set to metadata of the unmatched graphical objects of the second set, none of the metadata being displayed in any of the graphical diagrams; and
comparing the first set to the second set in multiple sequential comparing stages further includes case insensitive comparing of text of the unmatched graphical objects of the first set to text of the unmatched graphical objects of the second set.

19. A method to compare graphical diagrams, the method comprising:
comparing a first set of graphical objects of a first graphical diagram to a second set of graphical objects of a second graphical diagram;
in response to one or more identifying properties of a given graphical object of the first set matching one or more identifying properties of a given graphical object of the second set, declaring the given graphical object of the first set and the given graphical object of the second set a matched pair;
marking each graphical object of the first set that is unmatched to any graphical object in the second set a deleted graphical object;
marking each graphical object of the second set that is unmatched to any graphical object in the first set an added graphical object; and
generating and displaying a comparison graphical diagram that visually identifies differences between the first and second graphical diagrams, the differences including at least one of: one or more deleted graphical objects or one or more added graphical objects,
wherein:
comparing the first set to the second set comprises comparing the first set to the second set in multiple sequential comparing stages;
at each comparing stage, each graphical object of the first and second sets that has been declared as part of a matched pair is removed from a group of unmatched graphical objects and unmatched graphical objects of the first set in the group are compared to unmatched graphical objects of the second set in the group;
comparing the first set to the second set in multiple sequential comparing stages includes comparing of metadata of the unmatched graphical objects of the first set to metadata of the unmatched graphical objects of the second set, none of the metadata being displayed in any of the graphical diagrams; and
comparing the first set to the second set in multiple sequential comparing stages further includes endpoint comparing of unmatched connector graphical objects of the first set to unmatched connector graphical objects of the second set.

* * * * *